United States Patent
Mori

(10) Patent No.: US 9,217,533 B2
(45) Date of Patent: Dec. 22, 2015

(54) VIBRATION ISOLATING TABLE

(71) Applicant: ROLAND CORPORATION, Shizuoka (JP)

(72) Inventor: Yoshiaki Mori, Shizuoka (JP)

(73) Assignee: ROLAND CORPORATION, Shizuoka (JP)

( * ) Notice: Subject to any disclaimer, the term of this patent is extended or adjusted under 35 U.S.C. 154(b) by 0 days.

(21) Appl. No.: 14/283,226

(22) Filed: May 21, 2014

(65) Prior Publication Data

US 2015/0115127 A1 Apr. 30, 2015

(30) Foreign Application Priority Data

Oct. 31, 2013 (JP) .................................. 2013-006272
Oct. 31, 2013 (JP) ................................. 2013-227327

(51) Int. Cl.
| | |
|---|---|
| *F16M 13/00* | (2006.01) |
| *F16M 11/22* | (2006.01) |
| *G10D 13/00* | (2006.01) |
| *F16F 15/02* | (2006.01) |
| *G10K 11/00* | (2006.01) |
| *F16F 15/08* | (2006.01) |

(52) U.S. Cl.
CPC .............. *F16M 11/22* (2013.01); *F16F 15/021* (2013.01); *F16F 15/08* (2013.01); *G10D 13/006* (2013.01); *G10K 11/002* (2013.01)

(58) Field of Classification Search
CPC ........... F16F 15/08; F16F 15/04; F16F 15/00; G11B 33/08; G10D 13/006; F16M 11/22
USPC .................. 248/632, 550; 108/2; 84/421, 402
See application file for complete search history.

(56) References Cited

U.S. PATENT DOCUMENTS

| | | | | |
|---|---|---|---|---|
| 3,917,201 A | * | 11/1975 | Roll .................... | A47B 13/02 248/550 |
| 5,285,995 A | * | 2/1994 | Gonzalez ............ | G05D 19/02 248/550 |
| 5,594,177 A | * | 1/1997 | Hanse ................. | G01M 7/027 73/663 |
| 5,881,981 A | | 3/1999 | Yanagisawa | |
| 6,029,962 A | | 2/2000 | Shorten et al. | |
| 8,022,282 B1 | * | 9/2011 | Burns .................. | G10D 13/00 84/421 |
| 8,536,435 B2 | * | 9/2013 | Mori ................... | G10D 13/006 84/421 |

FOREIGN PATENT DOCUMENTS

| | | |
|---|---|---|
| CN | 201298360 | 8/2009 |
| GB | 2302579 | 1/1997 |
| JP | H11-024660 | 1/1999 |
| JP | 2012-198473 | 10/2012 |

OTHER PUBLICATIONS

"The Partial European Search Report", issued on Oct. 5, 2015, pp. 1-5.

* cited by examiner

*Primary Examiner* — Todd M Epps
(74) *Attorney, Agent, or Firm* — Jianq Chyun IP Office

(57) ABSTRACT

A vibration isolating table is adapted to be disposed between a vibrating body, which vibrates with the playing of a musical instrument, and a floor for suppressing vibration or shock generated by the vibrating body from transmitting to the floor, wherein the vibration isolating table includes: a rigid plate including a plate-shaped member having predetermined rigidity; and a main body portion supporting the rigid plate in a floating condition above the floor. The main body portion is formed of an elastic body having higher elasticity than the rigid plate and includes a bulge means which bulges in a shape tapered from one side to the other side, wherein a lower surface side of the rigid plate is supported by the one side or the other side of the bulge means.

28 Claims, 11 Drawing Sheets

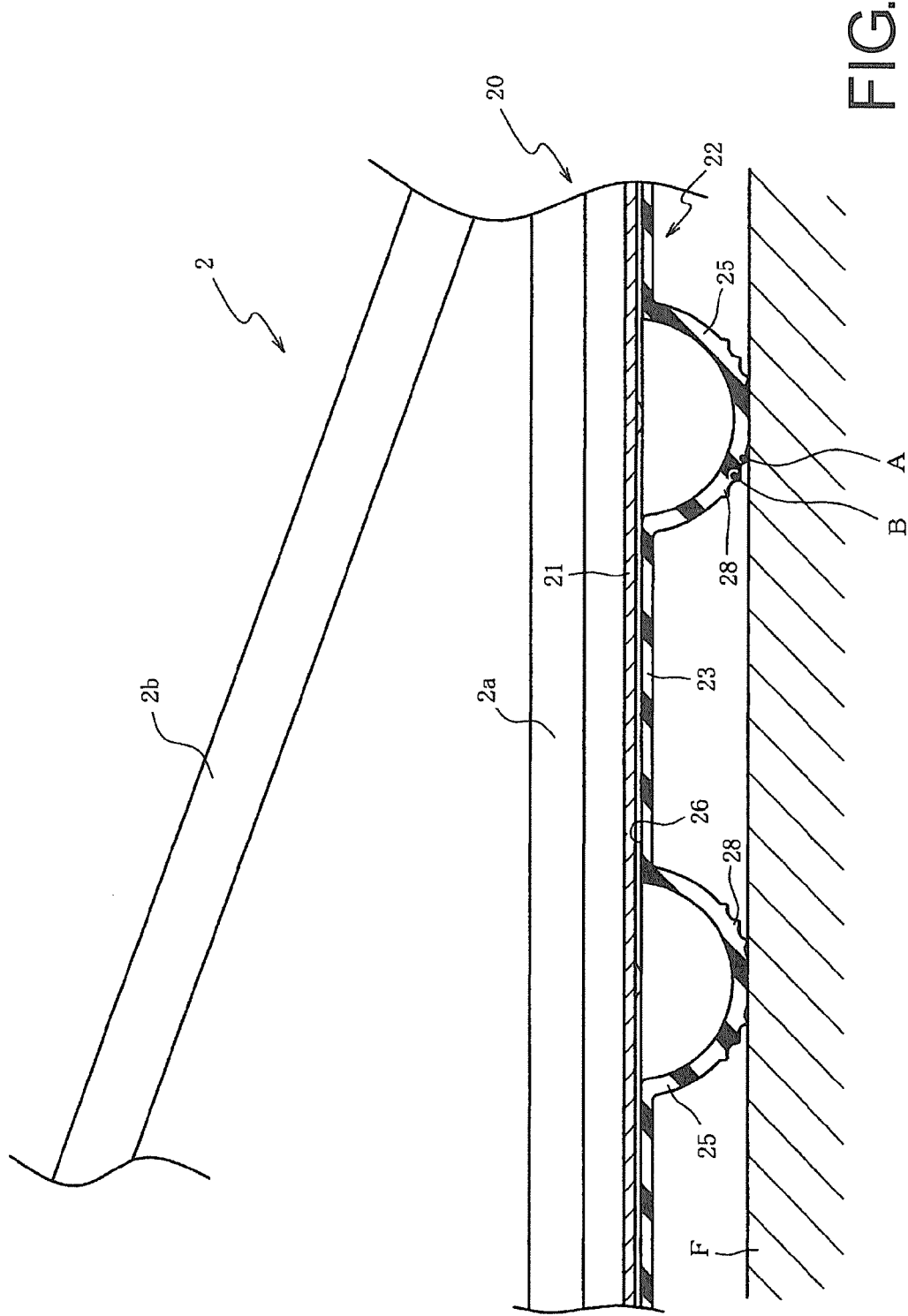

VIBRATION ISOLATING TABLE

CROSS-REFERENCE TO RELATED APPLICATIONS

This application claims the priority benefit of Japan application serial no. 2013-227327, filed on Oct. 31, 2013, and serial no. 2013-006272, filed on Oct. 31, 2013. The entirety of the above-mentioned patent applications are hereby incorporated by reference herein and made a part of this specification.

BACKGROUND OF THE INVENTION

1. Field of the Invention

The present invention relates to a vibration isolating table and particularly relates to a vibration isolating table that has a simplified structure and requires lower production costs, and is capable of reducing the vibration or shock transmitted to the floor.

2. Description of Related Art

Intense vibration or shock that occurs in conjunction with the playing of a percussion instrument is applied to a stand that supports the percussion instrument or a kick pedal that is used for striking the percussion instrument. For this reason, when the percussion instrument is played with the vibrating body, i.e. the stand or the kick pedal, placed in contact with the floor, the vibration or shock is directly transmitted to the floor and causes noise on the floor.

As one of the means for reducing the noise generated from the floor, a commonly-known technique is to dispose a vibration absorbing member between the vibrating body and the floor for suppressing the vibration or shock transmitted from the vibrating body to the floor.

Patent Literature 1 discloses a technique of distributing multiple foot members 12 (main body portion), made of a vibration absorbing material, over a rear surface of a base plate 11 (rigid plate) which can carry a pedal 32 (kick pedal) of an electronic drum 30.

PRIOR ART LITERATURE

Patent Literature

[Patent Literature 1] Japanese Patent Publication No. 11-24660 (FIG. 2, etc.)

SUMMARY OF THE INVENTION

Problem to be Solved

However, the technique disclosed in Patent Literature 1 faces the following problems. In a situation where the foot members 12 are formed of a vibration absorbing material having low hardness, when a large load is applied, the foot members 12 may be compressed excessively, causing that the vibration or shock from the vibrating body may be transmitted to the floor without being attenuated sufficiently. On the other hand, in order that the foot members 12 can be properly compressed responsive to the assumed maximum load, it is necessary to form the foot members 12 using a vibration absorbing material having higher hardness. In that case, however, the vibration or shock transmitted from the vibrating body to the floor may not be reduced sufficiently.

Moreover, the technique disclosed in Patent Literature 1 further includes disposing a sound isolation sheet 17, etc., between an upper plywood 14 and a lower plywood of the base plate 11 and a particle board 16, in addition to the foot members 12, for attenuating the vibration or shock, which makes the structure more complicated and increases the production costs.

In view of the above, the present invention provides a vibration isolating table that has a simplified structure and requires lower production costs, and is capable of reducing the vibration or shock transmitted to the floor during playing of a musical instrument.

Solution to the Problem and Effect of the Invention

According to the vibration isolating table of the present invention, by disposing a vibrating body on a rigid plate in a state that a main body portion is placed in contact with the floor, the vibration or shock from the vibrating body is transmitted to the floor through the rigid plate and the main body portion. Because the rigid plate is supported by one side or the other side of a membranous bulge portion that bulges on the main body portion, the vibration or shock from the vibrating body is transmitted to the bulge portion.

Because the bulge portion has a shape that is tapered from the one side to the other side, even though the bulge portion is foil led of a rubbery elastic body that is hard enough for the bulge portion to be properly compressed responsive to the assumed maximum load during the playing, the other side of the bulge portion can still be elastically deformed easily. In other words, when a large load is applied, excessive compression of the bulge portion can be prevented; and the bulge portion can be elastically deformed easily by a small load.

Accordingly, the structure of the main body portion is simplified and the production costs are reduced. Meanwhile, the effect of reducing the vibration or shock of the vibrating body from transmitting to the floor by the bulge portion is achieved. As a result, noise generated from the floor during the playing of the musical instrument can be reduced.

In addition, because the rigid plate is plate-shaped and has a predetermined rigidity, and a lower surface side of the rigid plate is supported by the one side or the other side of each of multiple bulge portions, the load applied on the rigid plate can be dispersed uniformly on the multiple bulge portions. Hence, when a large load is applied, the effect of preventing excessively compressing a portion of the bulge portions is achieved.

According to the vibration isolating table of the present invention, a bulge means includes a plurality of membranous bulge portions, wherein each of the bulge portions may bulge in a shape tapered from one side to the other side.

In addition to the aforementioned effects, according to the vibration isolating table of the present invention, the rigid plate is formed of a metal material. Therefore, the thickness of the rigid plate can be reduced while the rigidity of the rigid plate is maintained. By doing so, the effect of avoiding disposing the vibrating body on the rigid plate at a position too high from the floor is achieved.

In addition to the aforementioned effects, according to the vibration isolating table of the present invention, the bulge portions are disposed at least at four corners of the rigid plate. Thus, the rigid plate can be stably supported on the floor. Accordingly, the effect of suppressing a wobble of the vibrating body on the rigid plate is achieved.

In addition to the aforementioned effects, according to the vibration isolating table of the present invention, the number of the bulge portions is set to be 6 or more. Therefore, the effect of preventing the load from the vibrating body from bending the rigid plate is achieved.

Further, the number of the bulge portions is set to be 16 or fewer. Thus, the respective bulge portions can be elastically deformed easily by the load applied by the vibrating body that is disposed on the rigid plate.

In addition to the aforementioned effects, according to the vibration isolating table of the present invention, because the hardness of the rubbery elastic body that constitutes the bulge portion is set to 50 degrees or more, the effect of preventing the bulge portion from being excessively compressed by the assumed maximum load is achieved.

Moreover, because the hardness of the rubbery elastic body that constitutes the bulge portion is set to 80 degrees or less, the respective bulge portions can be elastically deformed easily by the load applied by the vibrating body.

In addition to the aforementioned effects, according to the vibration isolating table of the present invention, because a permissible maximum weight of the vibrating body that the rigid plate can carry is set to be 4 kg or less per bulge portion, excessive compression of the bulge portion can be avoided, and as a result, the effect of suppressing the vibration or shock of the vibrating body from transmitting to the floor is achieved.

In addition to the aforementioned effects, according to the vibration isolating table of the present invention, if the load applied on the bulge portion is equal to or smaller than a predetermined value, the bulge portion is displaced (compressed) proportionally responsive to the applied load. Therefore, the bulge portion can be elastically deformed easily by a small load.

On the other hand, when the load applied on the bulge portion exceeds the predetermined value, the bulge portion can be displaced (compressed) according to a polynomial function with degree N responsive to the applied load. Thus, the bulge portion is difficult to displace, and as a result, the effect of easily avoiding excessively compressing the bulge portion is achieved. The displacement characteristic is for example a polynomial function with degree N, wherein N is an integer of 2 or 3, which is a displacement characteristic similar to a quadratic function or a cubic function.

In addition to the aforementioned effects, according to the vibration isolating table of the present invention, because the bulge portion has the dome shape, the other side of the bulge portion can be elastically deformed easily by a small load, and the effect of easily preventing the bulge portion from being excessively compressed by a large load from the vibrating body is achieved.

In addition to the aforementioned effects, according to the vibration isolating table of the present invention, the thickness of the bulge portion is set to be $1/10$ or more of a curvature radius of the bulge portion. Hence, the bulge portion has sufficient thickness and the bulge portion can be properly compressed responsive to the assumed maximum load. Further, plastic deformation of the bulge portion can be suppressed.

On the other hand, the thickness of the bulge portion is set to be $1/4$ or less of the curvature radius of the bulge portion. Hence, the bulge portion can be easily elastically deformed by a small load.

In addition to the aforementioned effects, according to the vibration isolating table of the present invention, by varying the thickness of the bulge portion from one side to the other side, the effect of adjusting a displacement characteristic of the bulge portion at will is achieved.

In addition to the aforementioned effects, according to the vibration isolating table of the present invention, multiple bulge portions are formed integrally with a covering portion and bulge on the covering portion. Therefore, the processes for installing the bulge portions on the rigid plate can be reduced in comparison with the case of forming the bulge portions individually.

In addition to the aforementioned effects, according to the vibration isolating table of the present invention, because the rigid plate is surrounded by an upright portion that is disposed upright along a circumferential portion on one surface side of the covering portion, the effect of restricting displacement of the rigid plate relative to the covering portion with the upright portion is achieved.

In addition to the aforementioned effects, according to the vibration isolating table of the present invention, the main body portion is divided into two or more parts. Thus, each of the divided parts of the main body portion can be reduced in size for easy handling. Accordingly, the effect of simplifying the process of installing the rigid plate to the main body portion is achieved.

In addition to the aforementioned effects, according to the vibration isolating table of the present invention, because the rigid plate is supported by one side of the bulge portion, the other side of the bulge portion can be placed in contact with the floor. Accordingly, as the load applied on the bulge portion increases, a contact area between the bulge portion and the floor is increased.

By doing so, if the load applied on the bulge portion is small, the contact area between the bulge portion and the floor becomes is decreased to reduce the vibration or shock transmitted to the floor.

Furthermore, if the load applied on the bulge portion is large, the contact area between the bulge portion and the floor is increased to enhance a gripping force that the bulge portion provides with respect to the floor. As a result, the effect of suppressing movement of the bulge portion relative to the floor is achieved.

In addition to the aforementioned effects, according to the vibration isolating table of the present invention, the inside and outside of the bulge portions communicate with each other through a groove portion and a communication hole. Thus, when the bulge portions are pressed by the floor, air inside the bulge portions can be smoothly released to the outside. Accordingly, the effect of preventing air pressure from hindering the elastic deformation of the bulge portions is achieved.

In addition to the aforementioned effects, according to the vibration isolating table of the present invention, protruding portions are formed to protrude on an external surface of the bulge portion. Therefore, the effect of enhancing the gripping force the bulge portion provides with respect to the floor is achieved.

In addition to the aforementioned effects, according to the vibration isolating table of the present invention, because the protruding portions are formed concentrically when viewed from the other side of the bulge portion, when a large load is applied on the bulge portion and compresses the bulge portion, more protruding portions can be in contact with the floor. Hence, even when a large load is applied, the gripping force on the floor is increased to suppress movement of the bulge portion relative to the floor.

In addition to the aforementioned effects, according to the vibration isolating table of the present invention, the rigid plate has a rectangular shape when viewed from above. When multiple vibration isolating tables are used together, the rigid plates can be arranged adjacent to each other without forming a gap therebetween.

In addition to the aforementioned effects, according to the vibration isolating table of the present invention, the rigid plate has a trapezoid shape when viewed from above. Therefore, the shape of the rigid plate can be made similar to the shape of the kick pedal. Accordingly, the effect of saving space for the vibration isolating table is achieved.

In addition to the aforementioned effects, according to the vibration isolating table of the present invention, because an outer circumferential side of the rigid plate is slidably supported by a cylindrical portion that extends along a direction connecting one side and the other side of the bulge portion, while the rigid plate is allowed to displace in the direction connecting one side and the other side of the bulge portion, displacement in a direction perpendicular to the direction connecting one side and the other side of the bulge portion can be restricted. Accordingly, the effects of preventing position deviation of the rigid plate relative to the bulge portion and preventing the vibrating body disposed on the rigid plate from slipping off are achieved.

In addition to the aforementioned effects, according to the vibration isolating table of the present invention, because the other side or the one side of the bulge portion is supported by a support portion that is disposed to hold the bulge portion and face the lower surface side of the rigid plate, the effect of facilitating compression of the bulge portion is achieved.

In addition to the aforementioned effects, according to the vibration isolating table of the present invention, an engaging portion located at a circumferential portion on an upper surface of the covering portion is engaged with a restricting portion that extends from an upper end of the cylindrical portion to the inner circumferential side. Thus, the effect of preventing the rigid plate and the covering portion from coming out of the cylindrical portion from above is achieved.

Further, a protruding surface portion protrudes above the engaging portion. With the protruding surface portion, it is possible to easily prevent the vibrating body disposed on the rigid plate from interfering with the restricting portion. Accordingly, the vibration isolating table can be used for vibrating bodies of various shapes. Thus, the effect of improving the versatility of the vibration isolating table is achieved.

In addition to the aforementioned effects, according to the vibration isolating table of the present invention, an upper surface of the protruding surface portion has a tapered shape that inclines downward toward the center. Therefore, the effect of suppressing the vibrating body disposed on the rigid plate from slipping off is achieved.

In addition to the aforementioned effects, according to the vibration isolating table of the present invention, because the vibrating body can be accommodated in a holding portion that is disposed upright on an upper surface of the rigid plate and slidably supported by the inner circumferential side of the cylindrical portion, position deviation of the vibrating body relative to the vibration isolating table can be avoided. Accordingly, the effect of preventing the vibrating body from slipping off the vibration isolating table is achieved.

In addition to the aforementioned effects, according to the vibration isolating table of the present invention, because the rigid plate is supported by the other side of the bulge portion, the contact area between the rigid plate and the bulge portion is increased as the load applied on the rigid plate increases. Accordingly, the effect of reducing the vibration or shock transmitted from the rigid plate by the bulge portion is achieved.

In addition to the aforementioned effects, according to the vibration isolating table of the present invention, a lower surface side of the support portion has a tapered shape that inclines upward from the outer circumferential side to the inner circumferential side of the cylindrical portion. Therefore, if the load applied on the bulge portion from the rigid plate is small, the outer circumferential side of the support portion can be in contact with the floor and the inner circumferential side of the support portion can be separated from the floor. Accordingly, if the vibration or shock transmitted from the rigid plate is small, the contact area between the main body portion and the floor is reduced and the effect of suppressing the vibration or shock from transmitting to the floor is achieved.

Moreover, if the load applied on the bulge portion from the rigid plate is large, the outer circumferential side and the inner circumferential side of the support portion can both be in contact with the floor. In other words, when great vibration or shock is applied from the rigid plate, the gripping force the support portion provides with respect to the floor is enhanced to achieve the effect of suppressing the movement of the vibration isolating table relative to the floor.

In addition to the aforementioned effects, according to the vibration isolating table of the present invention, because protruding portions protrude on the lower surface of the cylindrical portion, the gripping force the cylindrical portion provides with respect to the floor can be enhanced. Accordingly, the effect of suppressing the vibration isolating table from moving relative to the floor is achieved.

BRIEF DESCRIPTION OF THE DRAWINGS

FIG. 5 is a partially enlarged view illustrating the V section of the first vibration isolating table of FIG. 1.

DESCRIPTION OF THE EMBODIMENTS

Below exemplary embodiments of the present invention are described in detail with reference to the affixed figures.

Figure 1:
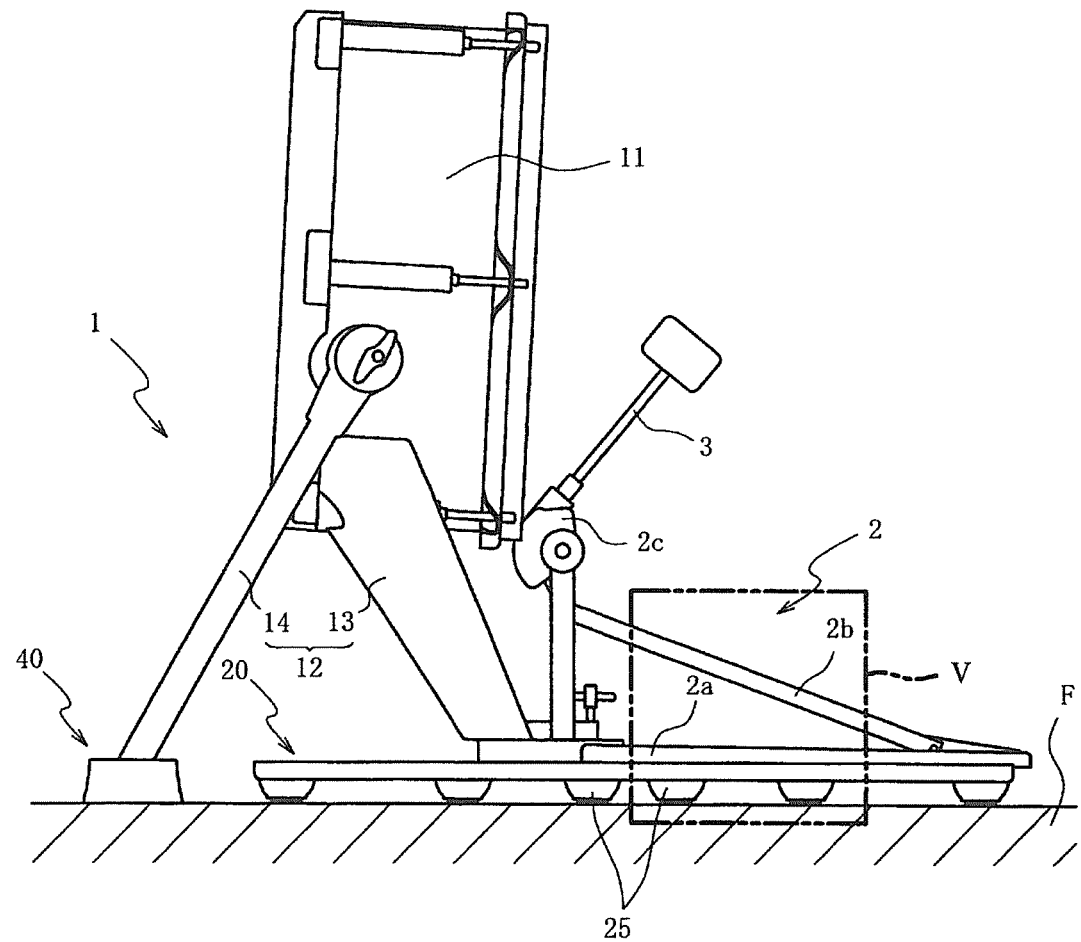
FIG. 1 is a schematic side view of a bass drum and a kick pedal disposed on a first vibration isolating table and a second vibration isolating table according to the first embodiment.

First, schematic structures of a first vibration isolating table 20 and a second vibration isolating table 40 of the first embodiment of the present invention are explained with reference to FIG. 1. FIG. 1 is a schematic side view of a bass drum 1 and a kick pedal 2 disposed on the first vibration isolating table 20 and the second vibration isolating table 40 according to the first embodiment.

As shown in FIG. 1, the bass drum 1 is an electronic percussion instrument that simulates an acoustic percussion instrument. The bass drum 1 includes a drum main body 11 for receiving striking of the player, a sensor (not shown) for detecting the striking on the drum main body 11, and a support stand 12 connected with an outer circumferential surface of the drum main body 11. The support stand 12 supports the drum main body 11 in a floating condition above a floor F. The support stand 12 includes a plate stand 13, which is plate-shaped, and a rod stand 14, which is rod-shaped.

The kick pedal 2 includes a plate-shaped base portion 2a, a pedal portion 2b pivotally supported by the base portion 2a, and a rotating portion 2c which rotates in conjunction with the pedal portion 2b. A beater 3 is fixed to the rotating portion 2c. With respect to the kick pedal 2, the base portion 2a is fixed to the plate stand 13. When the player steps on the pedal portion 2b, the beater 3 rotates along with the player's stepping to strike the drum main body 11.

The bass drum 1 and the kick pedal 2 are disposed on the first vibration isolating table 20 and the second vibration isolating table 40 that are placed in contact with the floor F.

The first vibration isolating table 20 and the second vibration isolating table 40 are devices configured for suppressing the vibration or shock of the bass drum 1 and the kick pedal 2 from transmitting to the floor F. The plate stand 13 of the bass drum 1 and the base portion 2a of the kick pedal 2 are disposed on the first vibration isolating table 20 while the rod stand 14 of the bass drum 1 is disposed on the second vibration isolating table 40.

Figure 2A:
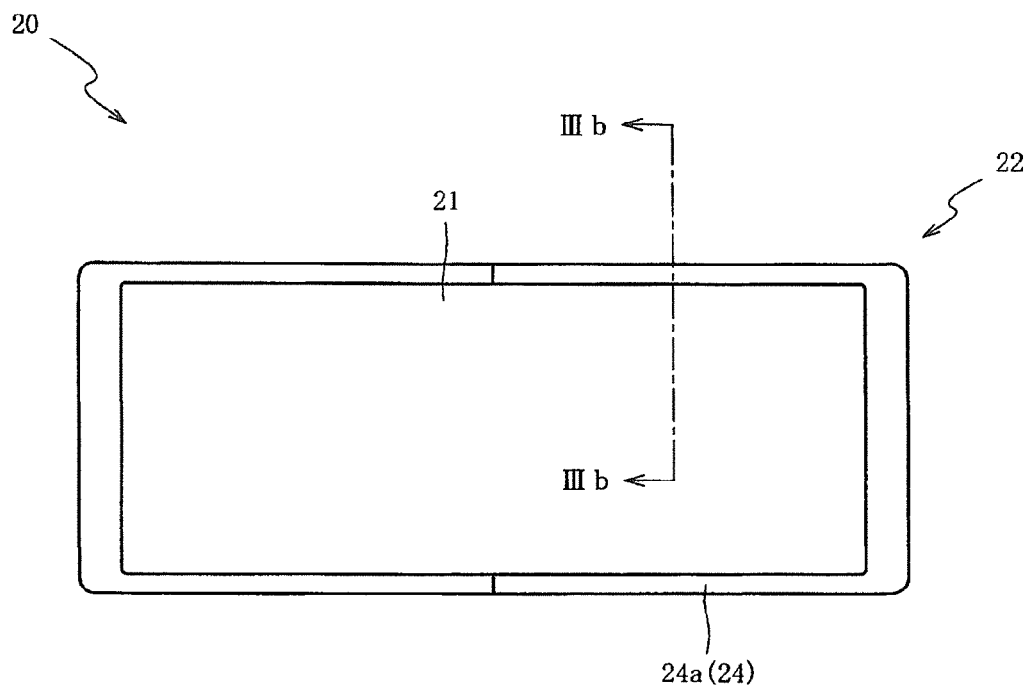
FIG. 2A is a schematic top view of the first vibration isolating table.
Figure 2B:
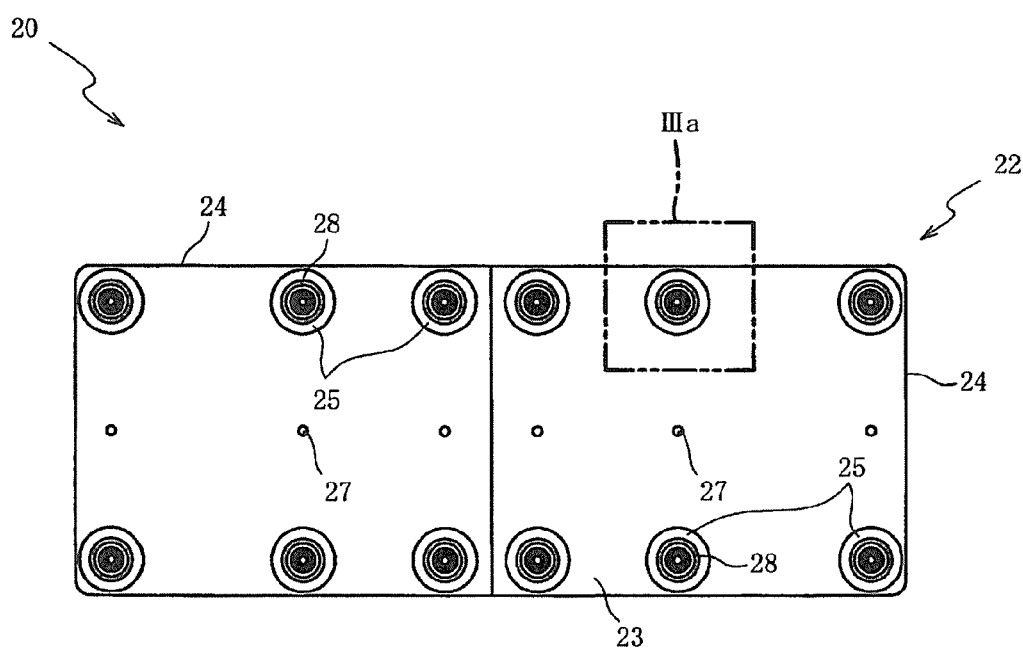
FIG. 2B is a schematic bottom view of the first vibration isolating table.
Figure 3A:
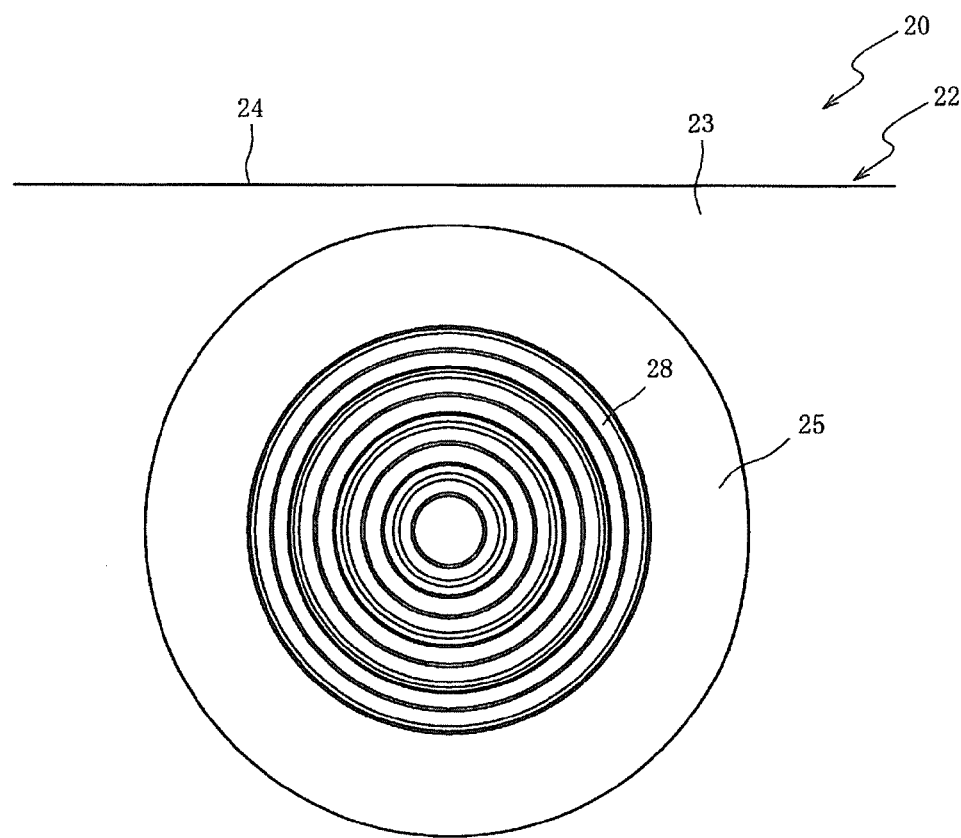
FIG. 3A is a partially enlarged bottom view illustrating the Ma section of the first vibration isolating table of FIG. 2B.
Figure 3B:
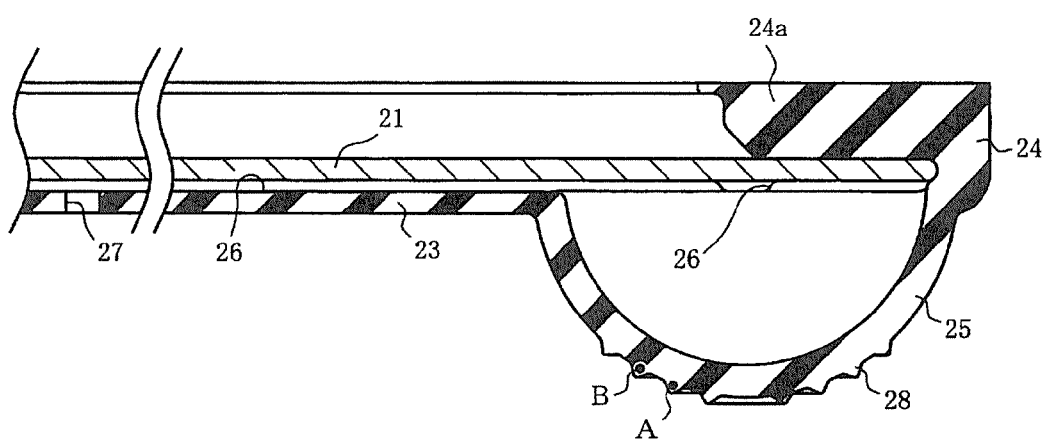
FIG. 3B is a schematic cross-sectional view of the first vibration isolating table along the line IIIb-IIIb of FIG. 2A.
Figure 4:
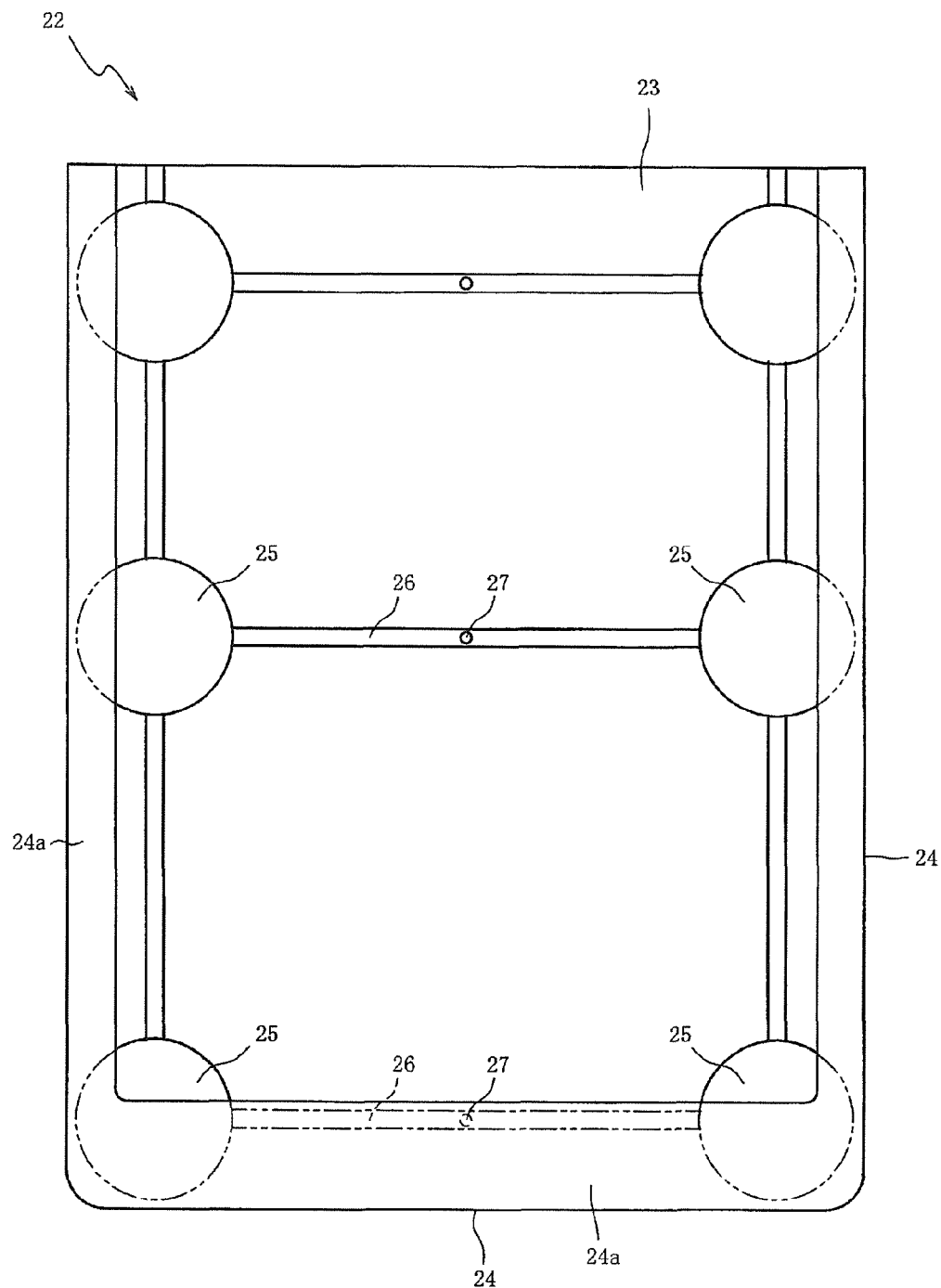
FIG. 4 is a schematic top view of a main body portion.

Next, the first vibration isolating table 20 is explained below with reference to FIGS. 2A, 2B to FIG. 4. FIG. 2A is a schematic top view of the first vibration isolating table 20. FIG. 2B is a schematic bottom view of the first vibration isolating table 20. FIG. 3A is a partially enlarged bottom view illustrating the IIIa section of the first vibration isolating table 20 of FIG. 2B. FIG. 3B is a schematic cross-sectional view of the first vibration isolating table 20 along the line IIIb-IIIb of FIG. 2A. FIG. 4 is a schematic top view of a main body portion 22.

As illustrated in FIGS. 2A, 2B to FIG. 4, the first vibration isolating table 20 includes a rigid plate 21, which is a rectangular plate made of a steel plate having predetermined rigidity, and the main body portion 22, which supports the rigid plate 21 in a floating condition above the floor F.

Because the rigid plate 21 has a rectangular plate shape, when multiple first vibration isolating tables 20 are used together, the rigid plates 21 can be arranged adjacent to each other without a gap therebetween. Moreover, a carpet, not shown here, is disposed to cover an upper surface of the rigid plate 21 (the surface at the paper front side of FIG. 2A).

The main body portion 22 is formed of an EPDM rubber that has hardness of 60 degrees and has higher elasticity than the rigid plate 21. The main body portion 22 is divided into two parts along a width direction (a vertical direction of FIG. 2A) at a central portion of a longitudinal direction (a horizontal direction of FIG. 2A). FIG. 4 illustrates only one side of the main body portion 22, which is divided into two parts, and the other side is omitted.

The main body portion 22 includes a covering portion 23 in a rectangular plate shape, an upright portion 24 disposed upright on a surface side (an upper side of FIG. 3B) of the covering portion 23, and a plurality of bulge portions 25 bulging on the other surface side (a lower side of FIG. 3B) of the covering portion 23.

The covering portion 23 is a member that covers a lower surface side (the lower side of FIG. 3B) of the rigid plate 21. The dimensions of the covering portion 23 in the longitudinal direction (the horizontal direction of FIG. 2B) and the width direction (the vertical direction of FIG. 2B) are set to be slightly larger than the dimensions of the rigid plate 21 in the longitudinal direction and the width direction respectively.

The upright portion 24 is disposed upright along a circumferential portion of the covering portion 23. An interval between the upright portions 24 that are arranged opposite to each other in the longitudinal direction or the width direction of the covering portion 23 is set to be approximately equal to the dimensions of the rigid plate 21 in the longitudinal direction or the width direction. Further, the upright portion 24 is formed with an extending portion 24a that extends from an upper end of the upright portion 24 toward an inner side of the covering portion 23. Moreover, a gap is formed between the extending portion 24a and the covering portion 23, and circumferential portions of the rigid plate 21 and the carpet (not shown) are inserted into the gap.

In a state that the rigid plate 21 is inserted into the gap between the covering portion 23 and the extending portion 24a, the rigid plate 21 is surrounded by the upright portion 24. Thus, displacement of the rigid plate 21 is restricted by the covering portion 23 and the upright portion 24. Therefore, position deviation of the rigid plate 21 and the carpet relative to the main body portion 22 can be avoided.

Accordingly, a fixing operation for installing the rigid plate 21 to the main body portion 22 with use of other materials, such as a bolt or an adhesive material, can be simplified. Thus, the installation process of the rigid plate 21 to the main body portion 22 can be simplified.

Here, when the rigid plate 21 and the carpet are inserted into the gap between the covering portion 23 and the extending portion 24a, the gap between the covering portion 23 and the extending portion 24a is expanded for the entire circumferential portions of the rigid plate 21 and the carpet to be inserted into the gap, but the insertion operation may be troublesome. In particular, it is necessary to set the rigid plate 21 to the dimensions suitable for carrying at least the plate stand 13 of the bass drum 1 and the base portion 2a of the kick pedal 2 (see FIG. 1). However, as the lengths of the rigid plate 21 in the longitudinal direction and the width direction increase, more efforts are required to carry out the insertion operation.

In contrast to the above, the main body portion 22 is divided into two parts. Each of the divided parts of the main body portion 22 is reduced in size for easy handling. In addition, the rigid plate 21 can be installed to the main body portion 22 by inserting the rigid plate 21 into the gap between the extending portion 24a and the covering portion 23 from divided portions (the upper side of FIG. 4) of the main body portion 22. Thus, the installation process is simplified.

The bulge portion 25 is a membranous member having a hollow dome shape that is tapered from one side to the other side of the bulge portion 25. The lower surface side of the rigid plate 21 is supported by the one side of the bulge portion 25.

In this embodiment, twelve bulge portions 25 are disposed on the main body portion 22, wherein two rows of six bulge portions 25, which are arranged along the longitudinal direction (the horizontal direction of FIG. 2B) of the covering portion 23 at irregular intervals, are respectively disposed in parallel on the circumferential portions at one end portion and the other end portion of the covering portion 23 in the width direction (the vertical direction of FIG. 2B).

In addition, six bulge portions are integrally formed with each covering portion 23 of the main body portion 22 that is divided into two parts. Thus, in comparison with forming twenty five bulge portions 25 individually, the processes for attaching the bulge portions 25 to the rigid plate 21 in the present invention can be reduced. Moreover, by inserting the rigid plate 21 into the gap between the covering portion 23 and the upright portion 24, the bulge portions 25 can be disposed at appropriate positions relative to the rigid plate 21. Accordingly, the process of installing the bulge portions 25 to the rigid plate 21 can be simplified.

Intervals between the adjacent bulge portions 25 in the longitudinal direction of the covering portion 23 are set smaller at the center side of the longitudinal direction of the covering portion 23 and set larger at two end sides of the longitudinal direction. By doing so, when a load is applied on the rigid plate 21, the central portion of the rigid plate 21 in the longitudinal direction can be prevented from bending.

Here, on one surface side (the upper side of FIG. 3B) of the covering portion 23, a plurality of groove portions 26, formed in a groove shape, are formed to communicate the adjacent bulge portions 25. In addition, in the groove portions 26 that extend in the width direction (the vertical direction of FIG. 2B) of the covering portion 23 among the plurality of groove portions 26, communication holes 27 are formed to penetrate the covering portion 23 in a thickness direction (the vertical direction of FIG. 3B) of the covering portion 23 to communicate the grooves 26 with the other surface side (the lower side of FIG. 3B) of the covering portion 23.

Because the inside and outside of the hollow bugle portions 25 can be communicated through the groove portions 26 and the communication holes 27, air inside the bulge portions 25 can be released smoothly to the outside.

In addition, protruding portions 28 are formed to protrude outward in a radial direction from an outer surface on the other side of the bulge portion 25. The protruding portions 28 are respectively formed concentrically when viewed from the other side (the paper front side of FIG. 3A) of the bulge portion 25.

Next, deformation of the bulge portions 25 in a state when the bass drum 1 and the kick pedal 2 are disposed on the first vibration isolating table 2 placed on the floor F is explained with reference to FIG. 5. FIG. 5 is a partially enlarged side view illustrating the V section of the first vibration isolating table 20 of FIG. 1. To make the disclosure more comprehensible, FIG. 5 illustrates a state where the rigid plate 21 and the main body portion 22 are viewed in cross-section.

As shown in FIG. 5, when the bass drum 1 (see FIG. 1) and the kick pedal 2 are disposed on the rigid plate 21 with the other sides of the bulge portions 25 in contact with the floor F, the weights of the bass drum 1 and the kick pedal 2 press the rigid plate 21 toward the side of the floor F and compress the bulge portions 25 between the rigid plate 21 and the floor F.

Because the rigid plate 21 is formed of the steel plate having the predetermined rigidity, deformation of the rigid plate 21 due to the load applied by the bass drum 1 and the kick pedal 2 can be suppressed. Therefore, the bass drum 1 and the kick pedal 2 can be stably disposed on the first vibration isolating table 20.

In addition, because the rigid plate 21 is formed of the steel plate having the predetermined rigidity and the lower surface side of the rigid plate 21 is supported by the multiple bulge portions 25, the load applied to the rigid plate 21 can be dispersed uniformly on the multiple bulge portions 25. That is, the load can be prevented from focusing on a portion of the multiple bulge portions 25. Hence, excessive compression of a portion of the bulge portions 25 can be suppressed and the rigid plate 21 can be stably supported by the multiple bulge portions 25.

Further, because the rigid plate 21 is formed of the steel plate, the thickness of the rigid plate 21 can be reduced while the rigidity of the rigid plate 21 is maintained. By doing so, it is possible to avoid disposing the kick pedal 2 on the rigid plate 21 at a position too high from the floor F, so as to reduce a sense of incongruity that the player may feel when stepping on the kick pedal 2.

The bulge portion 25 disposed between the rigid plate 21 and the floor F is hollow and tapered from the one side to the other side, and the other side of the bulge portion 25 is in contact with the floor F. Therefore, the other side of the respective bulge portion 25 can be elastically deformed easily by a small load from the rigid plate 21. Accordingly, the contact area between the floor F and the bulge portion 25 can be increased for stabilizing the first vibration isolating table 20 on the floor F. Consequently, backlash of the first vibration isolating table 20 can be prevented, and noise from the floor F, which results from the backlash, can be reduced.

In addition, because the main body portion 22 is disposed between the floor F and the bass drum 1 (see FIG. 1), the bulge portions 25 can suppress vibration of the floor F from transmitting to the bass drum 1. Accordingly, a sensor (not shown) of the bass drum 1 can be easily prevented from erroneously detecting the vibration transmitted from the floor F.

Further, the protruding portions 28 are formed to protrude on the outer surface on the other side of the bulge portion 25 to be in contact with the floor F. Thus, a gripping force that the bulge portion 25 provides with respect to the floor F can be increased. Hence, the first vibration isolating table 20 can be prevented from moving relative to the floor F.

Furthermore, by disposing the protruding portions 28 in contact with the floor F, the contact area between the bulge portion 25 and the floor F is smaller in comparison with a situation where the entire outer surface of the bulge portion 25 is in contact with the floor F. Accordingly, the vibration or shock transmitted from the bulge portion 25 to the floor F or from the floor F to the bulge portion 25 can be suppressed.

Figure 6A:
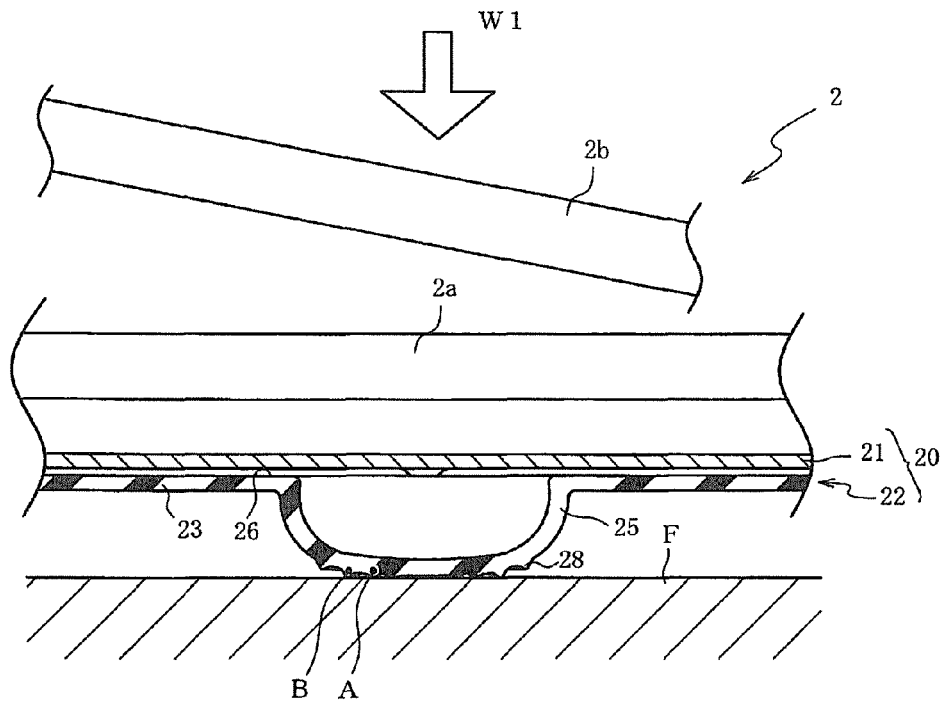
FIG. 6A and FIG. 6B are partially enlarged views of the first vibration isolating table.
Figure 6B:
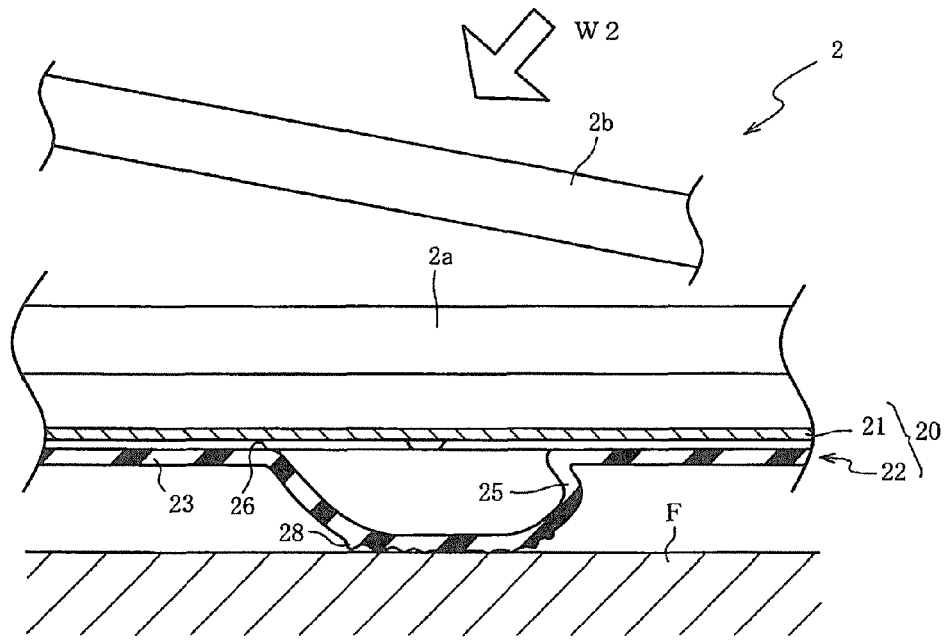

Hereinafter, deformation of the bulge portions 25 that occurs when the kick pedal 2 is stepped is explained with reference to FIGS. 6A and 6B. FIG. 6A and FIG. 6B are partially enlarged views of the first vibration isolating table 20. FIG. 6A illustrates a state where the pedal portion 2b is stepped to apply a load W1 downward on the kick pedal 2 while FIG. 6B illustrates a state where the pedal portion 2b is stepped to apply a load W2 downward and forward on the kick pedal 2. In order to make the disclosure easily comprehensible, FIG. 6A and FIG. 6B depict cross-sectional views of the rigid plate 21 and the main body portion 22.

As shown in FIG. 6A, when the pedal portion 2b is stepped to apply the load W1 downward on the kick pedal 2, great vibration or shock is applied on the first vibration isolating table 20, and the bulge portion 25 disposed between the rigid plate 21 and the floor F is further compressed.

Because the bulge portions 25 are formed of the EPDM rubber having the hardness of 60 degrees (by JIS type A durometer, the same below), excessive compression of the bulge portions 25 can be prevented. In other words, because the bulge portions 25 can be properly compressed responsive to the assumed maximum load during the playing, the vibration or shock from the rigid plate 21 can be reduced by the bulge portions 25 while plastic deformation of the bulge portions 25 can be suppressed.

Among parts of the bulge portion 25 that are in contact with the floor F, an outer edge portion mainly supports the load applied from the rigid plate 21. Thus, the bulge portion 25 is compressed to an extent that balances the load necessary to compress the outer edge portion and the load applied to the bulge portion 25.

Here, in a state before the kick pedal 2 is stepped (the state shown in FIG. 5), the outer edge portion of the entire parts of the bulge portion 25 that are in contact with the floor F is defined as a portion A; and in a state when the load W1 is applied (the state shown in FIG. 6A), the outer edge portion of the entire parts of the bulge portion 25 that are in contact with the floor F is defined as a portion B.

The bulge portion 25 bulges in the shape that is tapered from the one side to the other side. Moreover, the portion A is located closer to the other side of the bulge portion 25 than the portion B. Therefore, a circumferential length of the outer edge portion of the portion A, which is in contact with the floor F, is shorter than a circumferential length of the portion B. In other words, as the load applied on the bulge portion 25 and the contact area between the bulge portion 25 and the floor F increase, the circumferential length of the outer edge portion in contact with the floor F increases, and a larger load is required to compress the outer edge portion. Accordingly, compared to the portion B, the portion A can be elastically deformed easily by a small load.

Further, the bulge portion 25 has the hollow dome shape. Among cross sections perpendicular to the radial direction of the bulge portion 25, an angle formed between the cross section passing through the portion A and the floor F is smaller than an angle formed between the cross section passing through the portion B and the floor F. That is to say, as the load applied on the bulge portion 25 and the contact area between the bulge portion 25 and the floor F increase, the angle between the cross section, passing through the outer edge portion in contact with the floor F, and the floor F increases, and a larger load is required to compress the outer edge portion. Accordingly, compared to the portion B, the portion A can be elastically deformed easily by a small load.

According to the above, since the bulge portion 25 is formed in the hollow dome shape that is tapered from the one side to the other side, even though the bulge portion 25 is formed using the EPDM rubber having the hardness of 60 degrees, which is hard enough for the bulge portion 25 to be properly compressed by the assumed maximum load during the playing, the bulge portion 25 can still be elastically deformed by the small load applied respectively on the bulge portion 25 from the rigid plate 21. Therefore, transmission of the vibration and shock, resulting from a small load, from the rigid plate 21 to the floor F can be reduced by the bulge portion 25.

On the other hand, the outer edge portion of the portion B, which is in contact with the floor F, has a longer circumferential length than the portion A, and the angle between the cross section passing through the portion B and the floor F is larger than the angle between the cross section passing through the portion A and the floor F. Therefore, a larger load is required in order to elastically deform the portion B.

That is, when a large load is applied on the respective bulge portion 25 from the rigid plate 21, excessive compression of the bulge portion 25 can be easily avoided and the bulge portion 25 can be properly compressed. Accordingly, transmission of the vibration and shock, resulting from the large load, from the rigid plate 21 to the floor F can be reduced by the bulge portion 25.

Based on the above, the structure of the main body portion 22 is simplified and the production costs of the first vibration isolating table 20 are reduced. Further, the vibration or shock applied from the bass drum 1 or the kick pedal 2 can be suppressed from transmitting to the floor F by the bulge portion 25. As a result, noise generated from the floor F during the playing of the musical instrument can be reduced.

Moreover, when the bulge portion 25 is compressed, the air inside the bulge portion 25 can be smoothly released to the outside through the groove portions 26 and the communication holes 27. Thus, hindrance to the compression of the bulge portion 25 due to air pressure can be prevented.

In addition, the lower surface side of the rigid plate 21 is supported by the one side of the bulge portion 25 while the other side of the bulge portion 25 is in contact with the floor F. Therefore, as the load applied on the bulge portion 25 increases, the contact area between the bulge portion 25 and the floor F increased as well.

Accordingly, if the load applied on the bulge portion 25 is small, the contact area between the bulge portion 25 and the floor F becomes small and reduces the vibration or shock transmitted to the floor F. On the other hand, if the load applied on the bulge portion 25 is large, the contact area between the bulge portion 25 and the floor F is increased to enhance the gripping force that the bulge portion 25 provides with respect to the floor F. As a result, movement of the bulge portion 25 relative to the floor F can be suppressed.

Besides, the protruding portions 28 are formed concentrically when viewed from the other side of the bulge portion 25. Hence, the contact area between the protruding portions 28 and the floor F can be increased as the load applied on the bulge portion 25 increases.

Further, by forming the protruding portions 28 concentrically, multiple protruding portions 28 can be arranged in parallel along the radial direction of the bulge portion 25. In this way, even when the contact area between the bulge portion 25 and the floor F increases, the protruding portions 28 can be easily in contact with the floor F at the outer edge portion of the entire parts of the bulge portion 25 that are in contact with the floor F. Thus, the gripping force that the bulge portion 25 provides with respect to the floor surface F can be further enhanced.

As shown in FIG. 6B, when being stepped by the player, the load W2 is applied downward and forward (the left side of FIG. 6B) on the kick pedal 2, and the rigid plate 21 and the covering portion 23 are displaced forward. Consequently, the one side of the bulge portion 25 is drawn forward.

Due to the gripping force of the bulge portion 25 on the floor F, the other side of the bulge portion 25 can be prevented from being drawn forward relative to the floor F. Thus, when the load W2 is removed and the bulge portion 25 is restored to the shape before the load W2 is applied, the rigid plate 21 can return to the initial position before the load W2 is applied. Accordingly, the bass drum 1 and the kick pedal 2 can be prevented from moving away from their initial positions.

Moreover, since the protruding portions 28 are formed concentrically, when the rigid plate 21 and the covering portion 23 are displaced forward and cause the one side of the bulge portion 25 to displace forward, the protruding portions 28 foliated at a front side of the bulge portion 25 are in more contact with the floor F.

That is, by forming the protruding portions 28 concentrically, the gripping force of the bulge portion 25 with respect to the floor F can be enhanced. Thus, even if a large load is applied on the rigid plate 21 in a forward, backward, leftward, or rightward direction, the first vibration isolating table 20 can be suppressed from moving relative to the floor F.

In this embodiment, twelve bulge portions 25 are formed on the main body portion 22. The bulge portions 25 may be formed at least at four corners of the rigid plate 21.

By disposing the bulge portions 25 at least at four corners of the rigid plate 21, the rigid plate 21 can be stably supported on the floor F. Hence, the bass drum 1 and the kick pedal 2 on the first vibration isolating table 20 can be prevented from wobbling.

Preferably, the number of the bulge portions 25 formed on the main body portion 22 is in a range of six to sixteen.

By setting the number of the bulge portions 25 on the main body portion 22 to be six or more, excessive compression of the bulge portions 25 can be easily prevented when the assumed maximum load is applied on the rigid plate 21. In addition, by disposing four of the bulge portions 25 at the four corners of the rigid plate 21 and disposing the rest of the bulge portions 25 at least at the central portion of the rigid plate 21 in the longitudinal direction, bending of the central portion of the rigid plate 21 can be prevented.

Further, by setting the number of the bulge portions 25 on the main body portion 22 to be sixteen or fewer, even when the load applied on the rigid plate 21 is small, the respective bulge portions 25 can be elastically deformed easily.

In addition, a permissible maximum weight of the bass drum 1 and the kick pedal 2 that the rigid plate 21 is able to carry is preferably set to 4 kg or less per bulge portion 25, such that the bulge portions 25 can be prevented from being excessively compressed when the load is applied on the bulge portions 25. As a result, the vibration or shock from the bass drum 1 and the kick pedal 2 can be prevented from transmitting to the floor F, and plastic deformation of the bulge portions 25 can be suppressed as well.

Figures 7A, 7B:
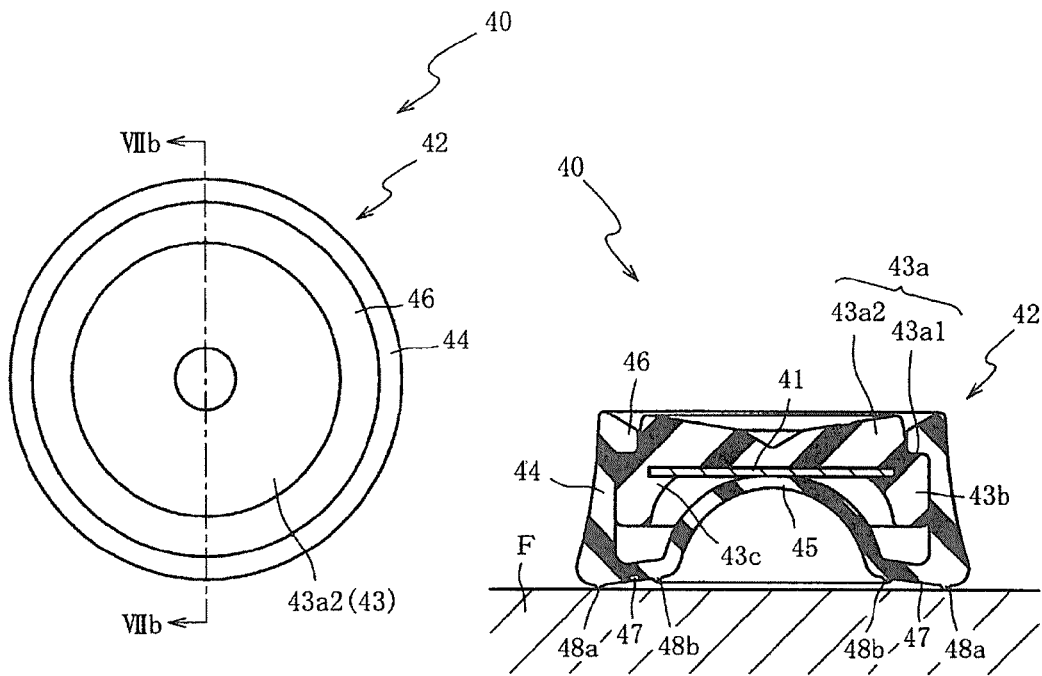
FIG. 7A is a schematic top view of the second vibration isolating table.
FIG. 7B is a schematic cross-sectional view of the second vibration isolating table along the line VIIb-VIIb of FIG. 7A.
Figures 7C, 7D:
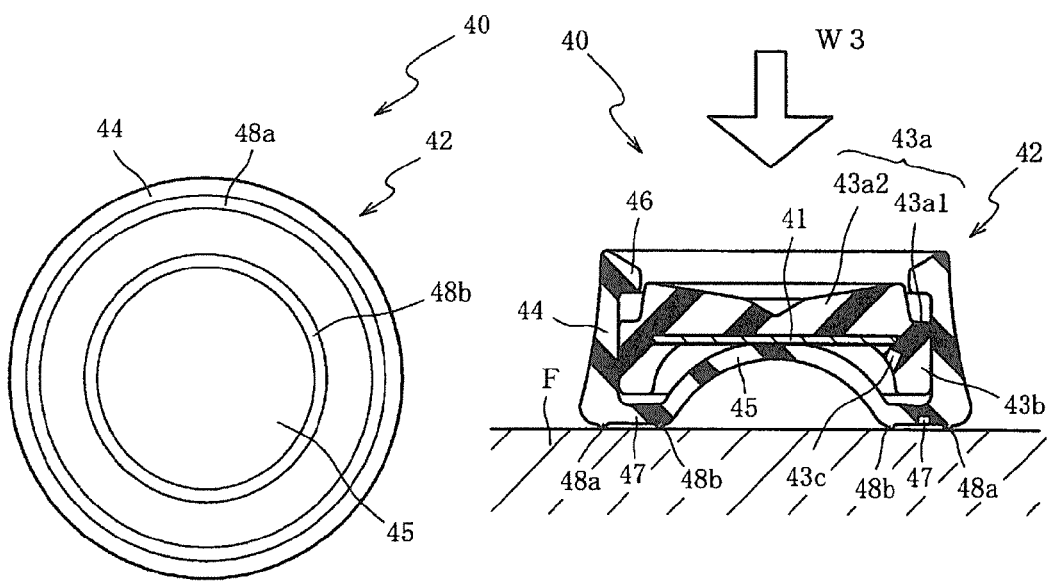
FIG. 7C is a schematic bottom view of the second vibration isolating table.
FIG. 7D is a schematic cross-sectional view of the second vibration isolating table.

Next, the second vibration isolating table 40 is explained with reference to FIGS. 7A to 7D. FIG. 7A is a schematic top view of the second vibration isolating table 40. FIG. 7B is a schematic cross-sectional view of the second vibration isolating table 40 along the line VIIb-VIIb of FIG. 7A. FIG. 7C is a schematic bottom view of the second vibration isolating table 40. FIG. 7D is a schematic cross-sectional view of the second vibration isolating table 40. Corresponding to the cross-sectional view of FIG. 7B, FIG. 7D illustrates a state when a load W3 is applied downward on a rigid plate 41.

As shown in FIG. 7A to FIG. 7C, the second vibration isolating table 40 mainly includes a disc-shaped rigid plate 41 and a main body portion 42 that supports the rigid plate 41 in a floating condition above the floor F.

The rigid plate 41 is formed of a steel plate having a predetermined rigidity. The main body portion 42 is formed of an EPDM rubber having hardness of 60 degrees, which has higher elasticity than the rigid plate 41. The main body portion 42 includes a covering portion 43 that covers the rigid plate 41, a cylindrical portion 44 having a cylindrical shape to slidably support the covering portion 43, and a bulge portion 45 accommodated in the cylindrical portion 44 and disposed under the rigid plate 41 and the covering portion 43.

The covering portion 43 includes a disc portion 43a having a disc shape to cover an upper surface side of the rigid plate 41, and an annular portion 43b having an annular shape to be disposed upright along a circumferential portion of a lower surface side (the lower side of FIG. 7B) of the disc portion 43a and to cover the circumferential portion of the rigid plate 41.

The disc portion 43a includes an engaging portion 43a1 that has a substantially annular shape when viewed from above and is disposed at a circumferential portion on an upper surface side thereof (the upper side of FIG. 7B), and a protruding surface portion 43a2 that has a substantially circular shape when viewed from above to be formed at an inner circumferential side of the engaging portion 43a1 and to protrude above the engaging portion 43a1.

The engaging portion 43a1 is a member to be engaged with the cylindrical portion 44. The protruding surface portion 43a2 is a member on which the rod stand 14 (see FIG. 1) is disposed.

The protruding surface portion 43a2 is formed in a tapered shape with the upper surface inclining downward toward the center. Thus, the rod stand 14 disposed on the upper surface of the protruding surface portion 43a2 can be prevented from slipping off.

The annular portion 43b is formed with an extending portion 43c that extends toward the center side of the disc portion 43a from a lower end thereof. Meanwhile, a gap is formed between the extending portion 43c and the disc portion 43a, and the circumferential portion of the rigid plate 41 is inserted into the gap. Accordingly, displacement of the rigid plate 41 relative to the covering portion 43 can be restricted by the covering portion 43.

The cylindrical portion 44 includes a restricting portion 46 having a substantially annular shape when viewed from above that extends inward from an upper end thereof in the radial direction of the cylindrical portion 44, and a support portion 47 having a substantially annular shape when viewed from below that extends inward from a lower end of the cylindrical portion 44 in the radial direction of the cylindrical portion 44 and supports one side of the bulge portion 45.

The restricting portion 46 is a member that is engaged with the engaging portion 43a1 of the covering portion 43, and an inner diameter of the restricting portion 46 is set smaller than an outer diameter of the engaging portion 43a1. Accordingly, the covering portion 43 that slides on the inner circumferential surface of the cylindrical portion 44 can be prevented from coming out of the cylindrical portion 44 from above.

In addition, because the protruding surface portion 43a2 of the covering portion 43 protrudes above the engaging portion 43a1, it is possible to easily prevent the rod stand 14 disposed on the protruding surface portion 43a2 from interfering with the cylindrical portion 44. Moreover, in the case of disposing a support stand having a shape different from the rod stand 14 on the protruding surface portion 43a2, interference between the support stand and the cylindrical portion 44 can still be prevented easily. Therefore, the versatility of the second vibration isolating table 40 is improved.

The support portion 47 is disposed to hold the bulge portion 45 and face the lower surface side of the rigid plate 41. An outer circumferential side of the support portion 47 is continuously connected with the inner circumferential surface of the cylindrical portion 44 while the inner circumferential side of the support portion 47 is continuously connected with the bulge portion 45.

Further, protruding portions 48a and 48b are formed concentrically on the lower surface side of the support portion 47 and respectively arranged at the inner circumferential side and the outer circumferential side of the support portion 47. With the protruding portions 48a and 48b disposed in contact with the floor F, the gripping force the support portion 47 has relative to the floor F can be increased.

The support portion 47 is formed in a tapered shape with the lower surface side of the support portion 47 inclining upward from the outer circumferential side to the inner circumferential side. Thus, when no load is applied on the rigid plate 41, the protruding portion 48a located at the outer circumferential side of the support portion 47 is in contact with the floor F and the protruding portion 48b located at the inner circumferential side of the support portion 47 is separated from the floor F.

The bulge portion 45 is a membranous member that bulges in a dome shape tapered gradually from one side to the other side. The one side of the bulge portion 45 is continuously connected with the support portion 47 and the other side of the bulge portion 45 abuts the lower surface side of the rigid plate 41. Because the one side of the bulge portion 45 is supported by the support portion 47, displacement of the bulge portion 45 relative to the cylindrical portion 44 can be suppressed.

As shown in FIG. 7D, when the load W3 is applied downward from the rod stand 14 (see FIG. 1) to the rigid plate 41, the bulge portion 45 disposed between the rigid plate 41 and the floor F is compressed.

Because the rigid plate 41 is formed of the steel plate having the predetermined rigidity, deformation of the rigid plate 41 due to the load applied from the rod stand 14 can be suppressed. Thus, it is possible to prevent the load from the rod stand 14 from being applied partially to a portion of the bulge portion 45. Accordingly, the bass drum 1 can be stably disposed on the second vibration isolating table 40.

Because the bulge portion 45 is formed using the EPDM rubber having the hardness of 60 degrees, excessive compression of the bulge portion 45 can also be prevented. In other words, since the bulge portion 45 can be properly compressed responsive to the assumed maximum load during the playing, the vibration or shock from the rigid plate 41 can be reduced by the bulge portion 45 while plastic deformation of the bulge portion 45 can be suppressed.

Moreover, because the bulge portion 45 has the dome shape that is tapered from the one side to the other side, even though the bulge portion 45 is formed of the EPDM rubber having the hardness of 60 degrees, which is hard enough for the bulge portion 45 to be properly compressed responsive to the assumed maximum load during the playing, the bulge portion 45 can still be elastically deformed by a small load applied on the bulge portion 45 from the rigid plate 41. Therefore, transmission of the vibration and shock, resulting from the small load, from the rigid plate 41 to the floor F can be reduced by the bulge portion 45.

On the other hand, when a large load is applied on the bulge portion 45 from the rigid plate 41, the bulge portion 45 can be properly compressed to avoid excessive compression. Accordingly, transmission of the vibration and shock, resulting from the large load, from the rigid plate 41 to the floor F can be reduced by the bulge portion 45.

Therefore, the structure of the main body portion 42 is simplified and the production costs of the second vibration isolating table 40 are reduced. Further, the vibration or shock applied from the bass drum 1 can be suppressed from transmitting to the floor F by the bulge portion 45. As a result, noise generated from the floor F during the playing of the musical instrument can be reduced.

Moreover, as the load applied on the bulge portion 45 increases, the contact area between the bulge portion 45 and the rigid plate 41 is increased, and therefore the vibration or shock from the rigid plate 41 can be easily reduced by the bulge portion 45.

In addition, since the covering portion 43 that covers the rigid plate 41 is slidably supported by the cylindrical portion 44, while the covering portion 43 can be displaced in an axial direction of the cylindrical portion 44 (the vertical direction of FIG. 7B), namely a direction connecting the one side and the other side of the bulge portion 45, displacement of the covering portion 43 is restricted in a direction perpendicular to the axial direction of the cylindrical portion 44 (the horizontal direction and a direction perpendicular to the paper surface of FIG. 7D).

Accordingly, displacement of the rigid plate 41 in the forward, backward, leftward, or rightward direction (the horizontal direction and the direction perpendicular to the paper surface of FIG. 7D) with respect to the bulge portion 45 can be restricted. Hence, position deviation of the rigid plate 41 relative to the bulge portion 45 can be prevented and the rod stand 14 disposed on the rigid plate 41 can be prevented from slipping off.

Further, the lower surface side of the rigid plate 41 is supported by the other side of the bulge portion 45, and the one side of the bulge portion 45 is supported by the support portion 47 that is disposed to hold the bulge portion 45 and face the rigid plate 41. Thus, the bulge portion 45 can be easily compressed by the load W3 that is applied downward on the bulge portion 45 from the rigid plate 41.

Here, when the load W3 is applied downward on the bulge portion 45, a force is generated to push the one side of the bulge portion 45 downward, and consequently the outer circumferential side of the support portion 47 is drawn to the inner circumferential side.

For this reason, if the inner circumferential side of the support portion 47 is in contact with the floor F before the load is applied on the bulge portion 45, by applying the load W3 downward on the bulge portion 45, the outer circumferential side of the support portion 47 may be easily lifted from the floor F.

Regarding this, the cylindrical portion 44 is formed in the tapered shape with the lower surface side of the support portion 47 inclining upward from the outer circumferential side to the inner circumferential side, and in the state before the load is applied downward on the bulge portion 45, the inner circumferential side of the support portion 47 is separated from the floor F. Therefore, when the load W3 is applied downward on the bulge portion 45, the protruding portion 48a at the outer circumferential side of the support portion 47 can remain in contact with the floor F.

Moreover, when a load equal to or larger than the predetermined value is applied on the bulge portion 45, the protruding portion 48b at the inner circumferential side of the support portion 47 can be in contact with the floor F. Since the protruding portions 48a and 48b respectively formed at the outer circumferential side and the inner circumferential side of the support portion 47 can both be in contact with the floor F, the gripping force that the bulge portion 45 provides with respect to the floor F is further enhanced. Accordingly, movement of the second vibration isolating table 40 relative to the floor F can be suppressed.

On the other hand, if the load W3 from the rigid plate 41 is equal to or smaller than the predetermined value and causes the vibration or shock transmitted from the rigid plate 41 to be small, the contact area between the bulge portion 45 and the floor F is reduced for suppressing the vibration or shock transmitted to the floor F.

Furthermore, with the protruding portions 48a and 48b in contact with the floor F, the contact area with the floor F is reduced in comparison with the case where the entire lower surface of the support portion 47 is in contact with the floor F. Thus, the vibration or shock transmitted from the rod stand 1 to the floor F can be reduced.

In this embodiment, the main body portion 22 of the first vibration isolating table 20 and the main body portion 42 of the second vibration isolating table 40 are formed of the EPDM rubber. However, the main body portions 22 and 42 may also be formed using other elastic materials, such as nitrile rubber, chloroprene rubber, ethylene rubber, polyisobutylene, fluorine rubber, silicone rubber, urethane rubber, etc.

Moreover, in this embodiment, the main body portions 22 and 42 are formed with the EPDM rubber with the hardness of 60 degrees. Nevertheless, it is preferable to set the hardness of the main body portions 22 and 42 in a range of 50 degrees to 80 degrees.

By setting the hardness of the main body portions 22 and 42 to 50 degrees or more, the bulge portions 25 and 45 can be elastically deformed properly responsive to the assumed maximum load applied on the rigid plates 21 and 41. That is to say, excessive compression of the bulge portions 25 and 45 can be prevented. Therefore, transmission of the vibration or shock, which results from a large load, to the floor F can be reduced by the bulge portions 25 and 45.

On the other hand, by setting the hardness of the main body portions 22 and 42 to 80 degrees or less, the bulge portions 25 and 45 can be easily elastically deformed by a small load. Thus, transmission of the vibration or shock, resulting from the small load, to the floor F can be reduced by the bulge portions 25 and 45.

Moreover, it is preferable to set the thickness of the bulge portion 25 of the first vibration isolating table 20 and the bulge portion 45 of the second vibration isolating table 40 in a range of 1/10 to 1/4 of a curvature radius of the bulge portions 25 and 45.

By setting the thickness of the bulge portions 25 and 45 to 1/10 or more of the curvature radius of the bulge portions 25 and 45, the bulge portions 25 and 45 can be elastically deformed properly responsive to the assumed maximum load applied on the rigid plates 21 and 41. On the other hand, by setting the thickness of the bulge portions 25 and 45 to 1/4 or less of the curvature radius of the bulge portions 25 and 45, the bulge portions 25 and 45 can be easily elastically deformed by a small load.

In this embodiment, the thickness of the bulge portion 25 of the first vibration isolating table 20 and the bulge portion 45 of the second vibration isolating table 40 is set to 3 mm and the curvature radius of the bulge portions 25 and 45 is set to 20 mm.

Figure 8:
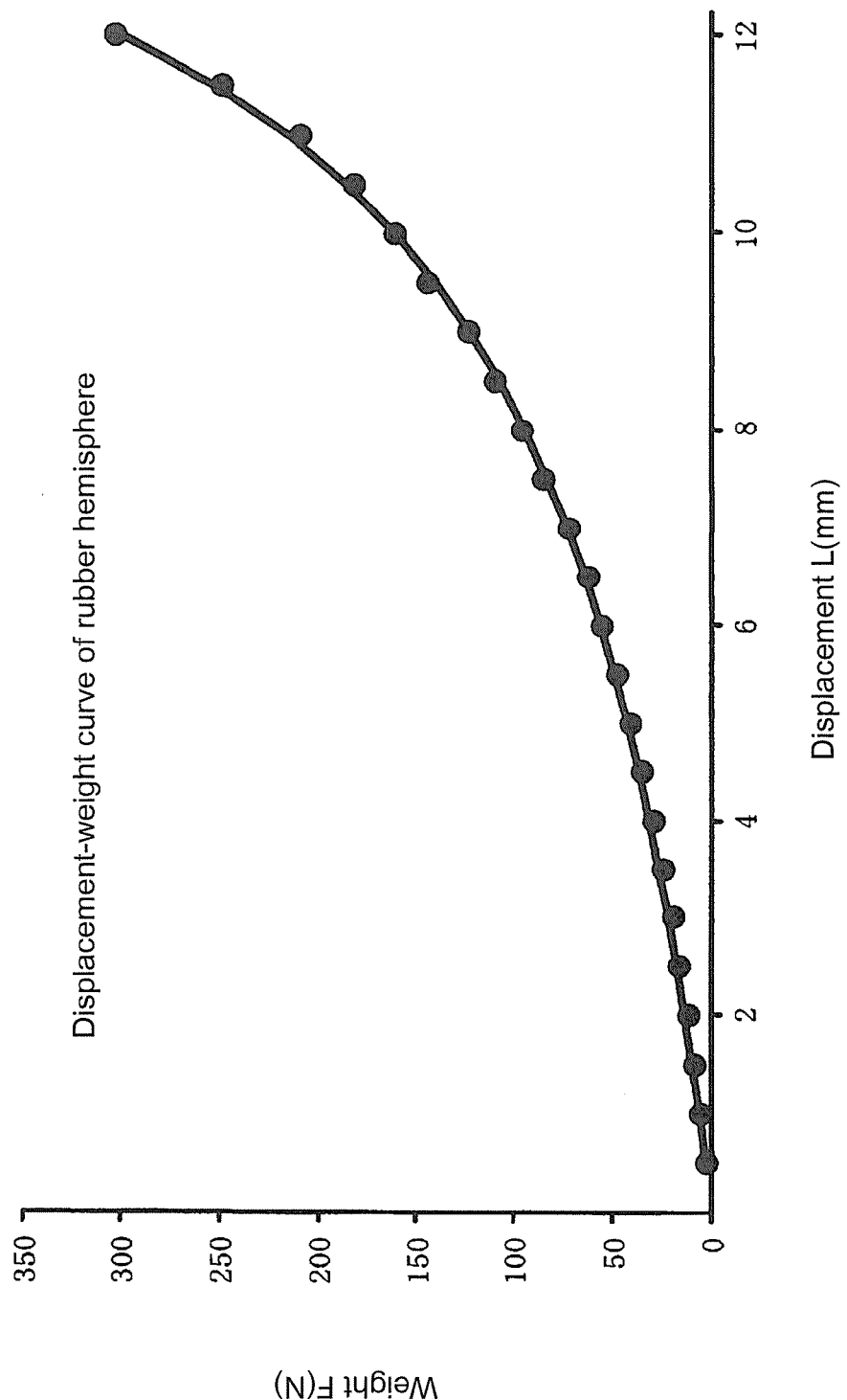
FIG. 8 is a graph showing test results of a compression test.

Here, a compression test performed on the bulge portion 25 of the first vibration isolating table 20 is explained below with reference to FIG. 8. FIG. 8 is a graph showing test results of the compression test. In the compression test, a steel plate was disposed to abut the other side of one bulge portion 25 of the first vibration isolating table 20, and a load was applied on the bulge portion 25 through the abutted steel plate. FIG. 8 is a graph showing a compression degree of the bulge portion 25 relative to the load on the steel plate.

According to the test results, as shown in FIG. 8, a load of about 10N is required for compressing the bulge portion 25 2 mm from an initial state (i.e. the state before the load was applied on the bulge portion 25); a load of about 35N is required for compressing the bulge portion 25 4 mm; a load of about 57N is required for compressing the bulge portion 25 6 mm; a load of about 95N is required for compressing the bulge portion 25 8 mm; and a load of about 142N is required for compressing the bulge portion 25 10 mm.

The test results show that, when the load applied on one bulge portion 25 is in a range of 0 to 40N, the bulge portion 25 is proportionally displaced (compressed) in a range of 1 mm to 5 mm; and when the load applied on one bulge portion 25 exceeds 40N, the bulge portion 25 has a characteristic of cubic-functional deformation.

In other words, even if the load applied on the steel plate is small, the bulge portion 25 can still be elastically deformed easily; and as the load applied on the steel plate increases, the bulge portion 25 becomes more difficult to compress.

It is considered that, because the outer circumferential portion of the contact portion between the steel plate and the bulge portion 25 that mainly supports the load has a short circumference when the load applied on the steel plate is small, the bulge portion 25 can be elastically deformed by the small load.

On the other hand, it is considered that, as the load applied on the steel plate increases, the circumference of the outer circumferential portion of the contact portion between the steel plate and the bulge portion 25 becomes longer, and thus a large load is required for elastically deforming the outer circumferential portion. As a result, the bulge portion 25 can be prevented from being compressed excessively.

In addition, the angle formed between the steel plate and the cross section perpendicular to the radial direction of the bulge portion 25 decreases from the one side to the other side of the bulge portion 25. For this reason, it is considered that, for the load applied in the direction from the other side to the one side of the bulge portion 25, the portion closer to the other side of the bulge portion 25 can be elastically deformed more easily by a small load.

On the other hand, the angle formed between the steel plate and the cross section perpendicular to the radial direction of the bulge portion 25 increases from the other side to the one side of the bulge portion 25. Therefore, it is considered that, for the load applied in the direction from the other side to the one side of the bulge portion 25, a larger load is required to elastically deform the portion closer to the one side of the bulge portion 25, and as a result, the bulge portion 25 can be prevented from being compressed excessively.

As described above, with the first vibration isolating table 20 and the second vibration isolating table 40, transmission of the vibration or shock, caused by various large loads applied on the rigid plates 21 and 41, to the floor F can be reduced by the bulge portions 25 and 45. As a result, noise generated from the floor F can be reduced.

Next, the second embodiment is explained below with reference to FIGS. 9A and 9B. In the second vibration isolating table 40 of the first embodiment, the lower surface side of the rigid plate 41 is supported by the other side of the bulge portion 44. In a second vibration isolating table 240 of the second embodiment, however, the rigid plate 41 is supported by the one side of the bulge portion. The same reference numerals are used to denote components the same as the first embodiment. Thus, detailed descriptions thereof are not repeated hereinafter.

Figure 9A:
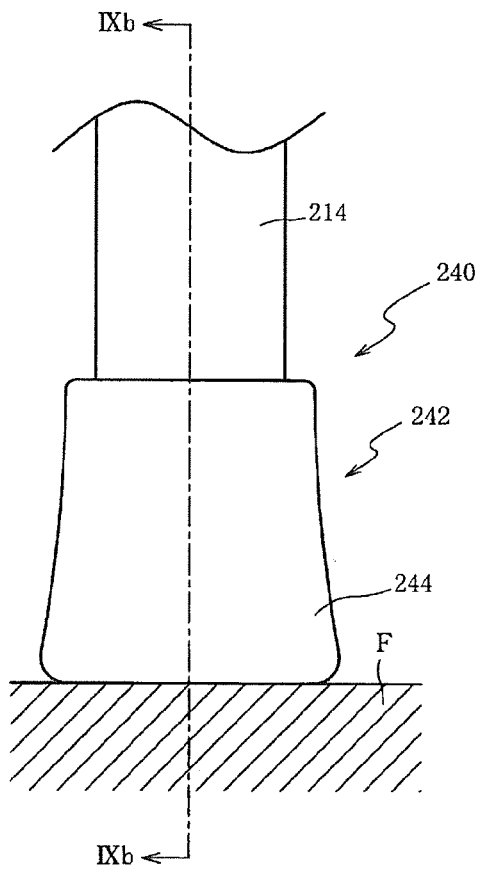
FIG. 9A is a schematic side view of the second vibration isolating table according to the second embodiment.

FIG. 9A is a schematic side view of the second vibration isolating table 240 according to the second embodiment. FIG. 9B is a schematic cross-sectional view of the second vibration isolating table 240 along the line IXb-IXb of FIG. 9A. FIG. 9A and FIG. 9B illustrate a state where a rod stand 214 is supported by the second vibration isolating table 240.

Figure 9B:
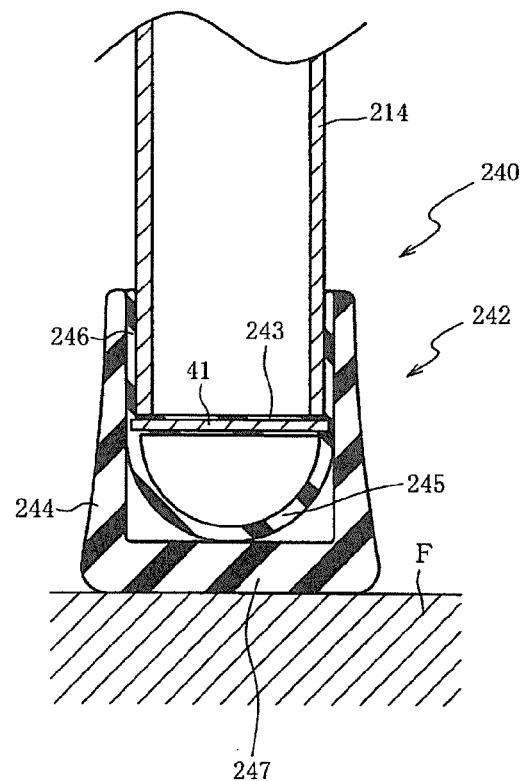
FIG. 9B is a schematic cross-sectional view of the second vibration isolating table along the line IXb-IXb of FIG. 9A.

As illustrated in FIG. 9A and FIG. 9B, the second vibration isolating table 240 is a device for reducing vibration or shock transmitted from the rod stand 214 to the floor F. The second vibration isolating table 240 includes the rigid plate 41 and a main body portion 242, which supports the rigid plate 41 in a floating condition above the floor F.

The main body portion 242 includes a covering portion 243 that covers the rigid plate 41, a cylindrical portion 244 having a cylindrical shape to slidably support the covering portion 243, and a bulge portion 245 accommodated in the cylindrical portion 244 and disposed under the rigid plate 41 and the covering portion 243.

The covering portion 243 covers the entire surface of the rigid plate 41 and a cylindrical holding portion 246 is disposed upright on an upper surface of the covering portion 243.

The holding portion 246 is a member for holding the rod stand 214, wherein an outer circumferential surface of the holding portion 246 is slidably supported by an inner circumferential surface of the cylindrical portion 244 and the inner circumferential side of the holding portion 246 is formed to accommodate the rod stand 214.

When the rod stand 214 is disposed on the second vibration isolating table 240, the rod stand 214 is accommodated in the holding portion 246 to prevent position deviation of the rod stand 214 relative to the second vibration isolating table 240, so as to prevent the rod stand 214 from slipping off the second vibration isolating table 240.

The cylindrical portion 244 is closed at a lower end side thereof and includes a support portion 247 for supporting the other side of the bulge portion 245.

The bulge portion 245 is a membranous member that bulges in a dome shape tapered gradually from the one side to the other side. The one side of the bulge portion 245 is continuously connected with the lower surface side of the covering portion 243 and the other side of the bulge portion 245 is supported by the support portion 247.

When a load is applied downward from the rod stand 214 to the rigid plate 41, the bulge portion 245 disposed between the rigid plate 41 and the support portion 247 is compressed.

Here, because the holding portion 246 that accommodates the rod stand 214 and the covering portion 243 that covers the rigid plate 41 are slidably supported by the cylindrical portion 244, while the rigid plate 41 and the covering portion 243 are allowed to displace in an axial direction of the cylindrical portion 244 (the vertical direction of FIG. 9D), namely a direction connecting the one side and the other side of the bulge portion 245, displacement of the rigid plate 41 and the covering portion 243 is restricted in a direction perpendicular to the axial direction of the cylindrical portion 244 (the horizontal direction and a direction perpendicular to the paper surface of FIG. 9D).

Accordingly, displacement of the rigid plate 41 and the rod stand 14 in the forward, backward, leftward, or rightward direction relative to the bulge portion 245 (the horizontal direction and the direction perpendicular to the paper surface of FIG. 9D) can be restricted. Hence, position deviation of the rigid plate 41 relative to the bulge portion 245 can be prevented and the rod stand 214 disposed on the rigid plate 41 can be prevented from slipping off.

Further, the lower surface of the rigid plate 41 is supported by the one side of the bulge portion 245 and the other side of the bulge portion 245 is supported by the support portion 247 that is disposed to hold the bulge portion 245 and face the rigid plate 41. Thus, the bulge portion 245 can be easily compressed and deformed. As a result, the vibration or shock transmitted from the rigid plate 41 to the bulge portion 245 can be reduced effectively.

Moreover, because the bulge portion 245 has the dome shape that is tapered from the one side to the other side, even though the bulge portion 245 is formed of the EPDM rubber having the hardness of 60 degrees, which is hard enough for the bulge portion 245 to be properly compressed responsive to the assumed maximum load during the playing, the bulge portion 245 can still be elastically deformed by a small load applied on the bulge portion 245 from the rigid plate 41. Therefore, transmission of the vibration and shock, resulting from the small load, from the rigid plate 41 to the floor F can be reduced by the bulge portion 245.

On the other hand, when a large load is applied on the bulge portion 245 from the rigid plate 41, excessive compression of the bulge portion 245 can be easily avoided and the bulge portion 245 can be properly compressed. Accordingly, transmission of the vibration and shock, resulting from the large load, from the rigid plate 41 to the floor F can be reduced by the bulge portion 245.

In this way, by forming the bulge portion 245 in the hollow dome shape tapered from the one side to the other side, it is possible to reduce the vibration or shock caused by various large loads. Thus, the vibration or shock transmitted to the floor F (see FIG. 7B) can be suppressed, and consequently, the noise generated from the floor F can also be reduced.

Then, the third embodiment is explained below with reference to FIGS. 10A and 10B. In the first embodiment, the thickness of the bulge portion 25 is uniform through the one side and the other side. In the third embodiment, however, the thickness of a bulge portion 325 gradually increases from one side to the other side. The same reference numerals are used to denote components the same as the first embodiment. Thus, detailed descriptions thereof are not repeated hereinafter.

Figure 10A:
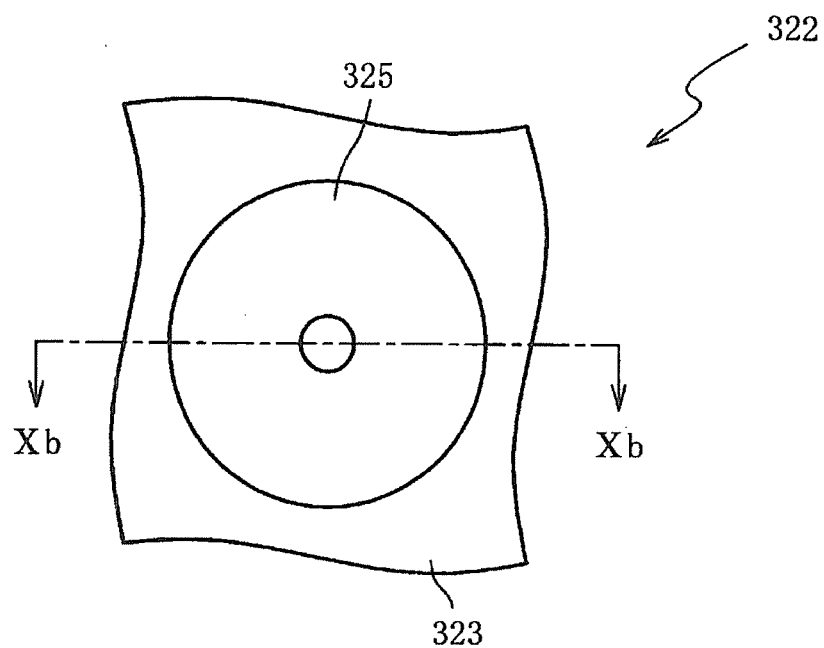
FIG. 10A is a partially enlarged bottom view of the main body portion according to the third embodiment.

FIG. 10A is a partially enlarged bottom view of a main body portion 322 of a first vibration isolating table 320 according to the third embodiment. FIG. 10B is a schematic cross-sectional view of the main body portion 322 of a first vibration isolating table 320 along the line Xb-Xb of FIG. 10A.

Figure 10B:
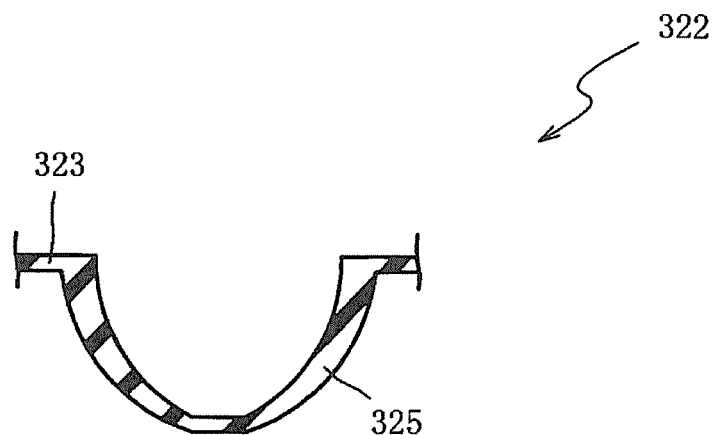
FIG. 10B is a schematic cross-sectional view of the main body portion along the line Xb-Xb of FIG. 10A.

As shown in FIG. 10A and FIG. 10B, the bulge portion 325 is a membranous member that bulges in a dome shape which is tapered from the one side to the other side (from the upper side to the lower side of FIG. 10B). The one side of the bulge portion 325 is continuously connected with a covering portion 323 and the other side of the bulge portion 325 is formed to be in contact with the floor F (see FIG. 1).

Moreover, because a chamfering process is performed on the other side of the bulge portion 325, the bulge portion 325 can be disposed in contact with the floor F (see FIG. 1) stably.

Further to the above, the thickness of the bulge portion 325 gradually decreases from the one side to the other side. Accordingly, a displacement characteristic of the bulge portion 325 can be adjusted at will.

Next, the fourth embodiment is explained below with reference to FIGS. 11A to 11D. In the first embodiment, the bulge portion 25 has the dome shape that is tapered from the one side to the other side. By contrast thereto, in the fourth embodiment, a bulge portion 425 has a substantially rhombic shape, when viewed from below, and is tapered from one side to the other side. The same reference numerals are used to denote components the same as the first embodiment. Thus, detailed descriptions thereof are not repeated hereinafter.

Figure 11C:
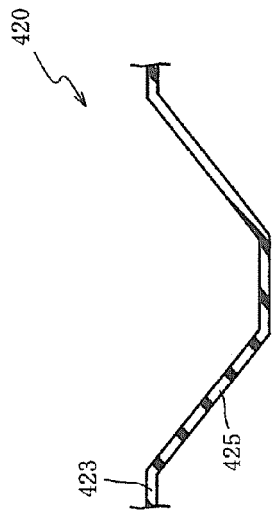
FIG. 11C is a schematic cross-sectional view of the main body portion along the line XIc-XIc of FIG. 11B.
Figure 11D:
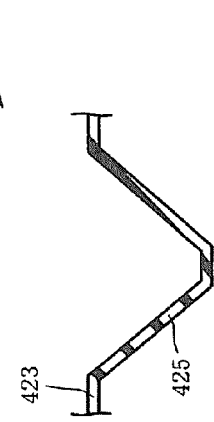
FIG. 11D is a schematic cross-sectional view of the main body portion along the line XId-XId of FIG. 11B.
Figure 11A:
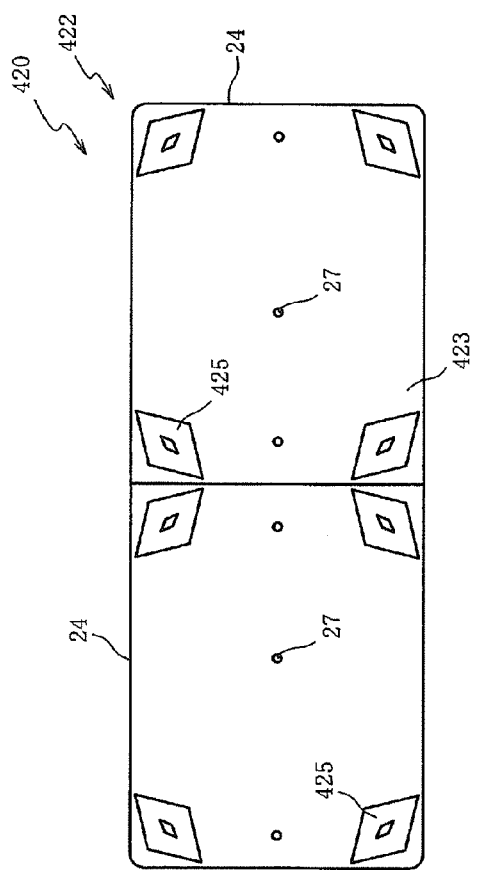
FIG. 11A is a schematic bottom view of the main body portion according to the fourth embodiment.
Figure 11B:
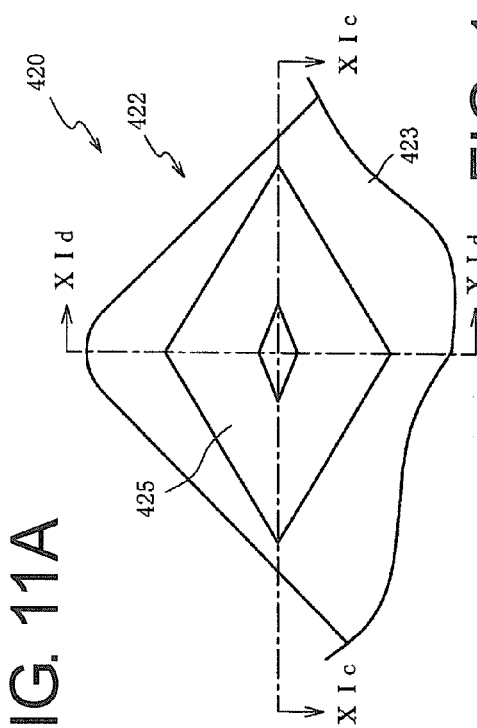
FIG. 11B is a partially enlarged bottom view of the main body portion.

FIG. 11A is a schematic bottom view of a main body portion 422 of a first vibration isolating table 420 according to the fourth embodiment. FIG. 11B is a partially enlarged bottom view of the main body portion 422 of a first vibration isolating table 420. FIG. 11C is a schematic cross-sectional view of the main body portion 422 of a first vibration isolating table 420 along the line XIc-XIc of FIG. 11B. FIG. 11D is a schematic cross-sectional view of the main body portion 422 of a first vibration isolating table 420 along the line XId-XId of FIG. 11B. To simplify the illustration and make it more comprehensible, FIG. 11C and FIG. 11D depict cross-sectional shapes of the bulge portion 425.

As shown in FIG. 11A and FIG. 11B, the bulge portion 425 is formed integrally with a covering portion 423 and bulges on the main body portion 422, wherein the bulge portion 425 is tapered from the one side to the other side (from the upper side to the lower side of FIG. 11B).

The bulge portion 425 is formed in the substantially rhombic shape when viewed from the other side, and the length of one diagonal line is set longer than the length of the other diagonal line. Moreover, because a chamfering process is performed on the other side of the bulge portion 425, the bulge portion 425 can be disposed in contact with the floor F (see FIG. 1) stably.

Eight bulge portions 425 are disposed on the main body portion 422, wherein two rows of four of the bulge portions 425, which are disposed at equal intervals along the longitudinal direction (the horizontal direction of FIG. 11A) of the covering portion 423, are respectively arranged in parallel on the circumferential portions at one end portion and the other end portion of the covering portion 423 in the width direction (the vertical direction of FIG. 11A). The bulge portions 425 are disposed in a way that diagonal lines of the bulge portions 425 which are adjacent to each other in the longitudinal direction and the width direction of the covering portion 423 are oriented towards different directions.

As illustrated in FIG. 11C and FIG. 11D, the bulge portion 425 is formed in a linear shape extending from one side to the other side. An angle formed between the floor F (see FIG. 1) and the bulge portion 425 connecting one side and the other side of the bulge portion 425 along one diagonal line is smaller than an angle formed between the floor F and the bulge portion 425 connecting one side and the other side of the bulge portion 425 along the other diagonal line.

Thus, when the other surface side of the bulge portion 425 is placed in contact with the floor F (see FIG. 1), it can be assured that a floor-contacting area in a direction along the one diagonal line is larger than a floor-contacting area in a direction along the other diagonal line. Hence, when a load is applied on the bulge portion 425 along the one diagonal line, a gripping force of the bulge portion 425 on the floor F is enhanced.

Further, in the main body portion 422 of a first vibration isolating table 420, the bulge portions 425 adjacent in the longitudinal direction and the width direction of the covering portion 423 are disposed with the one diagonal line facing different directions. Therefore, the gripping force that the bulge portions 425 provides relative to the floor F in the forward, backward, leftward, and rightward directions (the vertical direction and the horizontal direction of FIG. 11A) can be increased.

Because the bulge portion 425 is tapered from the one side to the other side, the contact area between the floor F and the bulge portion 425 is increased as the load applied downward on the bulge portion 425 increases.

Since the circumference of the outer circumferential portion of the contact portion between the floor F and the bulge portion 425 that mainly supports the load is short when the load applied on the bulge portion 425 is small, the bulge portion 425 can be elastically deformed by the small load.

On the other hand, as the load applied on the bulge portion 425 increases, the circumference of the outer circumferential portion of the contact portion between the bulge portion 425 and the floor F becomes longer, and therefore a large load is required for elastically deforming the outer circumferential portion. As a result, the bulge portion 425 can be prevented from being compressed excessively.

Accordingly, the bulge portion 425 can be elastically deformed easily by a small load. Therefore, transmission of the vibration and shock, which results from the small load, to the floor F can be reduced by the bulge portions 425. In addition, when a large load is applied on the bulge portion 425, excessive compression of the bulge portion 425 can be easily avoided and the bulge portion 425 can be properly compressed.

The above illustrates the present invention on the basis of the exemplary embodiments. However, it should be understood that the invention is not limited to any of the exemplary embodiments, and various modifications or alterations may be made without departing from the spirit of the invention.

For example, the above embodiments illustrate that the rigid plates 21 and 41 are formed of the steel plate having the predetermined rigidity. However, the present invention is not limited thereto. The rigid plate may be formed using a metal material other than the steel plate, or be formed of a plate-shaped member made of a material, such as wood or a resin material, instead of the metal material having the predetermined rigidity.

By forming the rigid plate using the metal material, the thickness of the rigid plate can be reduced while the rigidity of the rigid plate is maintained. Thus, it is possible to avoid disposing the kick pedal 2 on the rigid plate at a position too high from the floor F.

In the first to the third embodiments, the bulge portions 25, 45, 245, and 325 are respectively formed in the dome shape that is tapered from one side to the other side. In the fourth embodiment, the bulge portion 425 has the substantially rhombic shape, when viewed from above, and is tapered from one side to the other side. However, the present invention is not limited thereto. The bulge portion may have other shapes, such as a polygonal shape or an elliptical shape when viewed from above, as long as the bulge portion is tapered from one side to the other side.

In the above embodiments, multiple bulge portions 25, 325, and 425 of the first vibration isolating tables 20, 320, and 420 are arranged in parallel on the circumferential portion at one end portion and the other end portion of the covering portions 23, 323, and 423 in the width direction. However, the invention is not limited thereto. The bulge portions 25, 325, and 425 may also be disposed at other positions of the covering portions 23, 323, and 423, such as a central portion in the width direction of the covering portions 23, 323, and 423.

In the above embodiments, the main body portions 22, 322, and 422 of the first vibration isolating tables 20, 320, and 420 are divided into two parts along the width direction at the central portion of the longitudinal direction. However, the invention is not limited thereto. The main body portion may not be divided or may be divided into three parts. Moreover, the main body portion may be divided into two parts along the longitudinal direction.

By dividing the main body portions 22, 322, and 422 into two or more parts, each of the divided parts of the main body portions 22, 322, and 422 can be reduced in size for easy handling.

Further, if the main body portions 22, 322, and 422 are divided into two or more parts, the main body portions 22, 322, and 422 can be installed to a rigid plate with dimensions larger than the rigid plate 21 in the longitudinal direction or the width direction. In addition, if the main body portions 22, 322, and 422 are divided into three or more parts along the same direction, the main body portions 22, 322, and 422 can be installed to a rigid plate with dimensions smaller than the rigid plate 21 in the longitudinal direction or the width direction by omitting a part of the divided main body portions 22, 322, and 422. Accordingly, the versatility of the main body portions 22, 322, and 422 is improved.

In the above embodiments, the rigid plates 21 of the first vibration isolating tables 20, 320, and 420 are formed in the rectangular plate shape. However, the invention is not limited thereto. The rigid plate may also be in other shapes. For example, by forming the rigid plate in a substantially trapezoid shape, when viewed from above, which is similar to the base portion 2a of the kick pedal 2, the first vibration isolating table can save space.

In the first embodiment, the protruding portion 28 of the first vibration isolating table 20 and the protruding portions 48a and 48b of the second vibration isolating table 40 are formed concentrically when viewed from the other sides of the bulge portions 25 and 45. However, the invention is not limited thereto. For example, the protruding portion may also be formed in a shape other than the concentric shape, such as a radial shape or a spiral shape when viewed from the other sides of the bulge portions 25 and 45.

In the third embodiment, the thickness of the bulge portion 325 increases gradually from one side to the other side. However, the invention is not limited thereto. The thickness of the bulge portion 325 may gradually decrease from one side to the other side. Accordingly, the displacement characteristic of the bulge portion can be set at will.

What is claimed is:

1. A vibration isolating table, adapted to be disposed between a vibrating body that vibrates with playing of a musical instrument and a floor to suppress vibration or shock generated by the vibrating body from transmitting to the floor, the vibration isolating table comprising:
   a rigid plate formed of a plate-shaped member having a predetermined rigidity; and
   a main body portion supporting the rigid plate in a floating condition above the floor,
   wherein the main body portion is formed of an elastic body having higher elasticity than the rigid plate and comprises a bulge that bulges in a shape tapered from one side to the other side, and a lower surface side of the rigid plate is supported by the one side or the other side of the bulge.

2. The vibration isolating table according to claim 1, wherein the bulge comprises a plurality of membranous bulge portions, each of which bulges in a shape tapered from one side to the other side.

3. The vibration isolating table according to claim 1, wherein the rigid plate is formed of a metal material.

4. The vibration isolating table according to claim 2, wherein the plurality of bulge portions are disposed at least at four corners of the rigid plate.

5. The vibration isolating table according to claim 4, wherein the number of the plurality of bulge portions is in a range of 6 to 16.

6. The vibration isolating table according to claim 2, wherein the plurality of bulge portion is formed of a rubbery elastic body having hardness in a range of 50 degrees to 80 degrees.

7. The vibration isolating table according to claim 2, wherein a permissible maximum weight of the vibrating body to be disposed on the rigid plate is 4 kg or less per bulge portion.

8. The vibration isolating table according to claim 2, wherein the plurality of bulge portions have a characteristic of being displaced proportionally when an applied load is equal to or smaller than a predetermined value and being displaced according to a polynomial function with degree N when the applied load exceeds the predetermined value, N is an integer of 2 or 3.

9. The vibration isolating table according to claim 8, wherein the plurality of bulge portions are formed in a dome shape.

10. The vibration isolating table according to claim 9, wherein the thickness of the plurality of bulge portions is in a range of 1/10 to 1/4 of a curvature radius of the plurality of bulge portions.

11. The vibration isolating table according to claim 9, wherein the thickness of plurality of the bulge portion changes from the one side to the other side.

12. The vibration isolating table according to claim 2, wherein the main body portion comprises a covering portion having a plate shape to cover the lower surface side of the rigid plate, and the plurality of bulge portions are formed integrally with the covering portion and bulge on the covering portion.

13. The vibration isolating table according to claim 12, wherein the main body portion comprises an upright portion that is disposed upright on one surface side of the covering portion facing a lower surface of the rigid plate and extends along a circumference of the covering portion, and the rigid plate is surrounded by the upright portion.

14. The vibration isolating table according to claim 13, wherein the main body portion is divided into two or more parts.

15. The vibration isolating table according to claim 12, wherein, in the main body portion, the one side of the plurality of bulge portions is continuously connected with the covering portion.

16. The vibration isolating table according to claim 15, wherein the main body portion comprises a groove portion that is recessed on one surface side of the covering portion facing the lower surface of the rigid plate to communicate with the plurality of bulge portions, and a communication hole that penetrates the covering portion from the groove portion to the other surface side of the covering portion, wherein an inside and outside of the plurality of bulge portions are communicated through the groove portion and the communication hole.

17. The vibration isolating table according to claim 15, wherein the plurality of bulge portions comprise a protruding portion that protrudes on an external surface of the plurality of bulge portions.

18. The vibration isolating table according to claim 17, wherein the protruding portion is formed concentrically when viewed from the other side of the plurality of bulge portions.

19. The vibration isolating table according to claim 2, wherein the rigid plate has a rectangular shape when viewed from above.

20. The vibration isolating table according to claim 2, wherein the rigid plate has a trapezoid shape when viewed from above.

21. The vibration isolating table according to claim 1, wherein the main body portion comprises a cylindrical portion having a cylindrical shape that extends in a direction connecting the one side and the other side of the bulge, and an outer circumferential side of the rigid plate is slidably supported by an inner circumferential side of the cylindrical portion.

22. The vibration isolating table according to claim 21, wherein the cylindrical portion comprises a support portion that is formed on the inner circumferential side of the cylindrical portion to hold the bulge and face the lower surface side of the rigid plate, wherein the other side or the one side of the bulge is supported by the support portion.

23. The vibration isolating table according to claim 21, wherein the cylindrical portion comprises a restricting portion that extends from an upper end of the cylindrical portion toward the inner circumferential side of the cylindrical portion;
   the main body portion comprises a covering portion that covers at least an upper surface side of the rigid plate; and the covering portion comprises an engaging portion located at a circumferential portion of an upper surface of the covering portion to be engaged with the restricting portion, and a protruding surface portion located at an inner side of the engaging portion and protruding above the engaging portion.

24. The vibration isolating table according to claim 23, wherein the protruding surface portion has a tapered shape with an upper surface of the protruding surface portion inclining downward toward a center of the upper surface of the protruding surface portion.

25. The vibration isolating table according to claim 21, wherein the main body portion comprises a holding portion that is disposed upright in a cylindrical shape on an upper surface side of the rigid plate,
 wherein an outer circumferential side of the holding portion is slidably supported by the cylindrical portion, and an inner circumferential side of the holding portion is formed to accommodate the vibrating body.

26. The vibration isolating table according to claim 21, wherein the rigid plate is supported by the other side of the bulge.

27. The vibration isolating table according to claim 22, wherein the support portion has a tapered shape with a lower surface side inclining upward from an outer circumferential side of the cylindrical portion to the inner circumferential side of the cylindrical portion.

28. The vibration isolating table according to claim 22, wherein the support portion comprises a protruding portion that protrudes on a lower surface side of the support portion.

* * * * *